United States Patent [19]

Okamoto

[11] Patent Number: 4,980,729
[45] Date of Patent: Dec. 25, 1990

[54] COPYING MACHINE WITH IMPROVED DOCUMENT AND COPY SHEET HANDLING

[75] Inventor: Yuji Okamoto, Nara, Japan

[73] Assignee: Sharp Kabushiki Kaisha, Osaka, Japan

[21] Appl. No.: 389,863

[22] Filed: Aug. 4, 1989

[30] Foreign Application Priority Data

Aug. 10, 1988 [JP] Japan .................................. 63-200786

[51] Int. Cl.⁵ ............................................ G03G 21/00
[52] U.S. Cl. .................................... 355/320; 355/318; 355/319
[58] Field of Search ............... 355/308, 318, 319, 320, 355/321, 23, 24

[56]  References Cited

U.S. PATENT DOCUMENTS

| | | | |
|---|---|---|---|
| 3,844,654 | 10/1974 | Guenther | 355/24 |
| 4,247,192 | 1/1981 | Komori et al. | 355/320 X |
| 4,586,812 | 5/1986 | Kaneko et al. | 355/319 X |
| 4,816,872 | 3/1989 | Okamoto et al. | 355/23 |

Primary Examiner—A. T. Grimley
Assistant Examiner—Nestor R. Ramirez
Attorney, Agent, or Firm—Birch, Stewart, Kolasch & Birch

[57] ABSTRACT

A copying machine which comprises a document tray for accommodating a plurality of sheet-like documents to be copied; a first reading station at which a first of the sides of the document is scanned; a second reading station at which the other or second of the sides of the documetn is scanned; a document handling mechanism including a document inverting device including a document transport passage for inverting the document to permit the other or second of the sides thereof to be presented to the second reading station after the first of the sides thereof has been presented to the first reading station; a photosensitive medium for copying an image of each of the documents, scanned at any one of the first and second reading stations, onto a copying sheet; an intermediate tray for the temporary storage of the copying sheet after the latter has been moved past a transfer station and from which the copying sheet is subsequently transported again to the transfer station; a sheet inverting device for turning the copying sheet upside down before it is delivered onto the intermediate tray; and a sheet delivery passage leading to the intermediate tray. The transport of the document in the document transport passage parallels the transport of the copying sheet in the sheet delivery passage.

2 Claims, 15 Drawing Sheets

COPYING MACHINE WITH IMPROVED DOCUMENT AND COPY SHEET HANDLING

BACKGROUND OF THE INVENTION

1. Field of the Invention

The present invention relates to a copying machine of a type equipped with a recirculating document handling mechanism for automatically feeding a plurality of sheet-like documents to be copied onto a document reading station one at a time. The present invention is particularly suited for, although not exclusively limited to, use with sheet-like documents each having an image on both sides thereof.

In the description to follow, the following terms used herein for the purpose of the present invention are to be construed having the following respective meanings.

"Duplex document": a sheet-like document which has its opposite sides bearing respective images to be copied.

"Duplex copy": a copying or recording sheet having its opposite sides copied with respective images.

"Simplex document"; a document which has only one side bearing an image to be copied.

"Simplex copy": a copying or recording sheet having only one side copied with an image.

2. Description of the Prior Art

Most of the conventional electrophotographic copying machines of the slit exposure type in which a document to be copied is scanned by an optical system are equipped with a recirculating document handling mechanism (RDH) designed to feed a plurality of sheet-like documents to be copied automatically one at a time onto a document reading station so that each document can be read by an optical reader held at a predetermined position.

FIG. 1 illustrates, in schematic side sectional representation, an electrophotographic copying machine 1 equipped with a recirculating document handling mechanism that is employed in the practice of the prior art as well as the present invention. The electrophotographic copying machine 1 comprises a machine housing 2 having the recirculating document handling mechanism 3 and a document presser plate 4 both mounted atop the machine housing 2.

In order to make duplex copies from duplex documents with page layouts of each duplex copy identical with those of the corresponding duplex document, it is a general practice to place a stack of duplex documents within a document tray 5. Each of the stacked documents within the document tray 5 is transported by means of a feed roller 6 towards a first reading station 7 at which the respective document can be illuminated by an illuminator lamp 10 so that information on one of the sides of such a document can be read. After information on the respective side of the document has been read out at the first reading station 7, such document is turned upside down by a document inverting means 8 and is then transported to a second reading station 9 at, which information on the other remaining side of the document can be read out. At the second reading station 9, this other side of the document is illuminated by the illuminator lamp 10.

Imagewise rays of light reflected from the document at any one of the first and second reading stations 7 and 9 can be transmitted towards a photoreceptor drum 12 through an optical system 11 and is then projected onto a photosensitive surface of the photoreceptor drum 12 at exposure station 13. Since at this time the photosensitive surface of the photoreceptor drum 12 has been electrostatically charged by a primary corona discharger 14, projection of the imagewise rays of light onto the photosensitive surface of the photoreceptor drum 12 at the exposure station 13 results in a formation of an electrostatic latent image on the photosensitive surface in complemental relationship with an image on each side of the document. The electrostatic latent image so formed is then developed by a developing unit 15 into a visible toner image which is subsequently transferred at a transfer station by the action of a transfer corona discharger 18 onto a copying sheet that has been supplied from a sheet supply cassette 16 by means of a sheet feed roller 17.

The copying sheet bearing the visible toner image which has been transferred from the photosensitive surface of the photoreceptor drum 12 is then supplied through a fixing unit 19 by which the visible toner image can be permanently fixed to one side of the copying sheet. In order to make a copy on the other side of the copying sheet thereby to complete a duplexed copy, the copying sheet having one of the sides copied with an image from one of the sides of the duplexed document, is supplied towards an intermediate tray 21 through a sheet inverting means 20. Thereafter, the copying sheet once supplied to the intermediate tray 21 is drawn by a sheet feed roller 22 out of the intermediate tray 21 and towards the photoreceptor drum 12 for receiving a similarly visible toner image, corresponding to an image on the remaining side of the duplex document, from the photoreceptor drum 12 at the transfer station on the other or remaining side of the copying sheet. After the visible toner image has been transferred onto this other side of the copying sheet, the latter is transported through the fixing unit 19 so that the visible toner image can be permanently fixed thereto and is then ejected onto a copy receiving tray 23, thereby completing the duplex copying.

FIG. 6 comprised of FIGS. 6(a) to 6(h) illustrates the sequence of making the duplex copies from a plurality of simplex documents, for example, the first and second simplex documents Da and Db. It is to be noted that, in the following description, reference character "D" used to denote a document to be copied and to which a lower case "a" is affixed is intended to mean a first document while the same reference character "D" to which a lower case "b" is affixed is intended to mean a second document to be copied subsequent to the copying of the first document and that numerals "1" to "4" affixed to any one of reference characters "Da" and "Db" are intended to represent a page number of the first or second document. For example, the first page of the first document is designated by "Da1" and the third page of the second document is designated by "Db3". It is also to be noted that each copying sheet generally identified by P is shown to have its opposite sides designated respectively by Pa and Pb in correspondence with the first and second document Da and Db, respectively, and reference characters "Pa" and "Pb" are affixed with one of the numerals "1" to "4" to denote the page number of each of the documents.

In addition, for the purpose of quick reference, throughout the accompanying drawings, particularly FIGS. 6 and 7 as well as FIG. 4, each document Da or Db is shown as affixed on its opposite sides with numerals ("1" to "4") each representing the page number, while each odd-numbered page is indicated by a blank triangle. Also, so far as each copying sheet P is concerned, any one of the opposite sides of the copying sheet P which has been copied with an image is shown as having a numeral representative of the page number of the document on which such image has been born while each odd-numbered page is indicated by a blackened triangle. It is, however, to be noted that no affix will be employed to any one of the reference characters "D" and "P" used to denote the document and the copying sheet where the document or the copying sheet is collectively referred to in the description.

In order to make a duplex copy from each of the simplex documents, as shown in FIG. 6(a), the documents D to be successively copied are placed on the document tray 5 in a stacked form and in the sequentially paginated order with the initial page placed atop the stack of documents. A batch of copying sheets P is accommodated within the sheet supply cassette 16 in a stacked form.

When duplex copying is initiated, as shown in FIG. 6(b), the first document Da placed on the top of the stack of documents D within the document tray 5 is transported to the first reading station 7 at which the first page Da1 of the first document Da is scanned so that an image on the first page Da1 can be copied in any known manner on one side Pa1 of the first copying sheet Pa. Then, as shown in FIG. 6(c), the first document Da having its first page Da1 scanned at the first reading station 7 is subsequently transported to the document inverting means 8 and, on the other hand, the second document Db is transported to the first reading station 7 so that a copy can be made on one side Pb3 of the second copying sheet Pb.

As shown in FIG. 6(d), each of the first and second documents Da and Db whose first sides have been successively scanned at the first reading station 7 are transported past the second reading station 9 without being scanned through the document inverting means 8 and are returned to the document tray 5. On the other hand, the first and second copying sheets Pa and Pb, having one side on which a copy has been made, are successively transported through the sheet inverting means 20 onto the intermediate tray 21 and stacked therein. In this way, an image on one of the sides of each of the first and second documents Da and Db has been copied on one side of the associated copying sheet Pa or Pb.

In order to make a copy of an image on the other or opposite side of each of the, first and second documents Da and Db on the other or opposite side of the associated copying sheet Pa or Pb, the first and second documents Da and Db are successively transported again onto a reading station. As shown in FIG. 6(e), the first document Da drawn from the document tray 5 again onto the reading station is moved past the first reading station 7 without being scanned and towards the document inverting means 8. Thereafter, as shown in FIG. 6(f), at the second reading station 9, the second page Da2 of the first document Da is scanned so that an image on the second page Da2 of the first document Da can be copied on the other side Pa2 of the first copying sheet Pa which has been supplied from the lowermost position of the stack of copying sheets within the intermediate tray 21. In a manner similar to the copying on the first copying sheet Pa, as sequentially shown in FIGS. 6(g) and 6(h), the fourth page Db4 of the second document Db is scanned at the second reading station 9 so that an image of the fourth page Db4 can be copied on the respective side Pb4 of the second copying sheet Pb supplied from the intermediate tray 21. Thereafter, the first and second documents Da and Db are successively returned to the document tray 5 while the copying sheets Pa and Pb are successively ejected onto the copy receiving tray 23 after having passed through the fixing unit 19.

FIG. 7 comprised of FIGS. 7(a) to 7(h) illustrates the sequence of making the duplex copies from a plurality of duplex documents, for example, the first and second duplex documents Da and Db as is the case with the example shown in FIG. 6.

In order to make a duplex copy from each of the first and second duplex documents, as shown in FIG. 7(a), the documents D to be successively copied are placed on the document tray 5 in a stacked form and in the sequentially paginated order with the initial page placed atop the stack of documents. A batch of copying sheets P is accommodated within the sheet supply cassette 16 in a stacked form.

When duplex copying is initiated, as shown in FIG. 7(b), the first document Da placed on the top of the stack of documents D within the document tray 5 is transported to the first reading station 7 at which the first page Da1 of the first document Da is scanned so that an image on the first page Da1 can be copied in any known manner on one side Pa1 of the first copying sheet Pa. Then, as shown in FIG. 7(c), the first document Da having its first page Da1 scanned at the first reading station 7 is subsequently transported to and temporarily held at the document inverting means 8 while the first copying sheet P2, having the image copied on one side Pa1 thereof is transported through the sheet inverting means 20 to the intermediate tray 21.

Then, as shown in FIG. 7(d), the first document Da having passed through the document inverting means 8 is transported to the second reading station 9 at which the second page Da2 of the first document Da is scanned so that an image on the second page Da2 thereof can be copied on the other side Pa2 of the first copying sheet Pa which has been supplied from the intermediate tray 21. The first document Da having both its sides scanned at the first and second reading stations 7 and 9, respectively, at different timings is subsequently returned to the document tray 5 while, on the other hand, the first copying sheet P2, having both its sides copied with the images on the first and second pages Da1 and Da2 of the first document Da, is ejected through the fixing unit 19 onto the copy receiving tray 23. It is to be noted that, when the first document Da is returned to the document tray 5, the first document Da is inserted in between the bottom of the document tray 5 and the lowermost member of the stack of documents in the document tray 5.

After the first document Da has been so returned to the document tray 5, images on the remaining opposite side of the second document Db are successively copied on the respective opposite side of the second copying sheet Pb in a manner similar to the copying of the images of the first document Da on the first copying sheet P3, and as sequentially shown in FIGS. 7(e) to 7(h).

According to the first mentioned duplex copying method shown in and described with reference to FIG. 6, each document D is required to be transported twice into the passages in the recirculating document handing mechanism 3 and, therefore, there is the possibility that the document D may be damaged. Also, during a period in which the document D is circulated once from the first reading station 7 to the second reading station 9 through the document transport passage, the associated copying sheet P is required to be retained temporarily at the intermediate tray and, therefore, one cycle of the duplex copying operation tends to take a relatively long time to complete. In addition, the intermediate tray must have a size required to accommodate the plural copying sheet generally equal in number to the maximum possible number of documents to be copied and, therefore, the utilization of the limited space available within the machine housing tends to be adversely affected On the other hand, according to the second mentioned duplex copying method shown in and described with reference to FIG. 7, each document may be once transported into the passages in the recirculating document handling mechanism 3 and, therefore, the possibility of the document being damaged can be advantageously minimized. Also, the intermediate tray may have a size sufficient to accommodate at least a single copying sheet since only one copying sheet is transported to the intermediate tray during one cycle of the duplex copying operation. Therefore, the utilization of the limited space available within the machine housing can be advantageously maximized and, hence, the length of time required to complete a copying job can be advantageously reduced.

However, after the copying of the image on one side of the document D onto one side of the copying sheet P, the copying sheet P is required to be transported through the sheet inverting means 20 to the intermediate tray and to be subsequently drawn out from the intermediate tray in readiness for the copying of an image on the remaining other side of the document onto the corresponding other side of the copying sheet. During the period in which the copying sheet is circulated past the intermediate tray, the document D is required to be temporarily held in the document inverting means and, at this time, no scanning operation can take place. Therefore, the second mentioned prior art duplex copying method has a disadvantage in that each cycle of the duplex copying operation takes a relatively long time and, therefore, the utilization of the time required to complete a copying job cannot be maximized.

SUMMARY OF THE INVENTION

Accordingly, the present invention has been devised with a view to substantially eliminating the above discussed problems inherent in the prior art duplex copying machines and has for its object to provide an improved copying machine equipped with a document handling mechanism that is effective to maximize the utilization of the time required to complete a copying job and, therefore, to accomplish each cycle of the duplex copying operation in a reduced length of time.

In order to accomplish the above described object, the present invention provides a copying machine which comprises a document storage means for accommodating a plurality of sheet-like documents to be copied; a first document presenting portion for supporting thereon the documents successively drawn from the document storage means so that one of the sides of each of the documents can be scanned; a second document presenting portion for supporting thereon each of the documents which has been passed through the first document presenting portion, so that the other or remaining opposite side of each of the documents can be scanned; And a document handing mechanism including a document inverting means positioned between the first and second document presenting portions for inverting each of the documents; a photosensitive medium for copying an image of each of the documents, scanned at any one of the first and second document presenting portions, onto a copying sheet; an intermediate storage means for the temporary storage of the copying sheet after the latter has been moved past the photosensitive medium and from which the copying sheet is subsequently transported again to the photosensitive medium; a sheet inverting means positioned between the photosensitive medium and the intermediate storage means for turning the copying sheet upside down; the document handling mechanism having a document transport passage means; and a sheet transport passage means, the document and copying sheet being moved along the document transport passage means and the sheet transport passage means simultaneously.

According to the present invention, the copying machine is provided with a recirculating document handling mechanism mounted atop the machine housing. The recirculating document handling mechanism has a document transport passage means for transporting the documents successively from the document storage means back to the document storage means through the first document presenting portion, then through a document inverting means and finally through the second document presenting portion. Each of the documents when transported to the first document presenting portion has one of its sides scanned and has the other of its sides scanned subsequently at the second document presenting portion after it has been turned upside down by the document inverting means.

At each of the first and second document presenting portions, imagewise rays of light reflected from any one of the respective sides of the document which has been scanned are projected onto the photosensitive medium to form on the photosensitive medium an image corresponding to the image on the respective side of the document, which image is subsequently copied on a first side of the copying sheet.

Within the machine housing, there is formed a sheet transport passage means for transporting each copying sheet from the photosensitive medium back to the photosensitive medium through the sheet inverting means and then through the intermediate storage means. By the provision of this sheet transport passage means, the copying sheet having one side copied with an image is turned upside down by the sheet inverting means and is then temporarily stored in the intermediate storage means, after which the copying sheet is transported again to the photosensitive medium so that the image can be copied on the opposite or second side thereof.

In accordance with an essential feature of the present invention, during duplex copying, the documents successively transported through the document transport passage means within the recirculating document handling mechanism and the copying sheets having their opposite sides onto which images are to be copied, which sheets are transported along a sheet transport passage means within the machine housing, are transported simultaneously through the document and sheet transport passage means respectively. In other words, the transport of the document through the document transport passage means within the recirculating document handling mechanism parallels the transport of the copying sheet through the sheet transport passage means within the machine housing. Accordingly, the length of time required to complete the duplex copying with respect to a single copying sheet can be advantageously reduced.

BRIEF DESCRIPTION OF THE DRAWINGS

This and other objects the present invention will become clear from the following description taken in conjunction with a preferred embodiment thereof with reference to the accompanying drawings, in which.

DETAILED DESCRIPTION OF THE INVENTION

Figure 1:
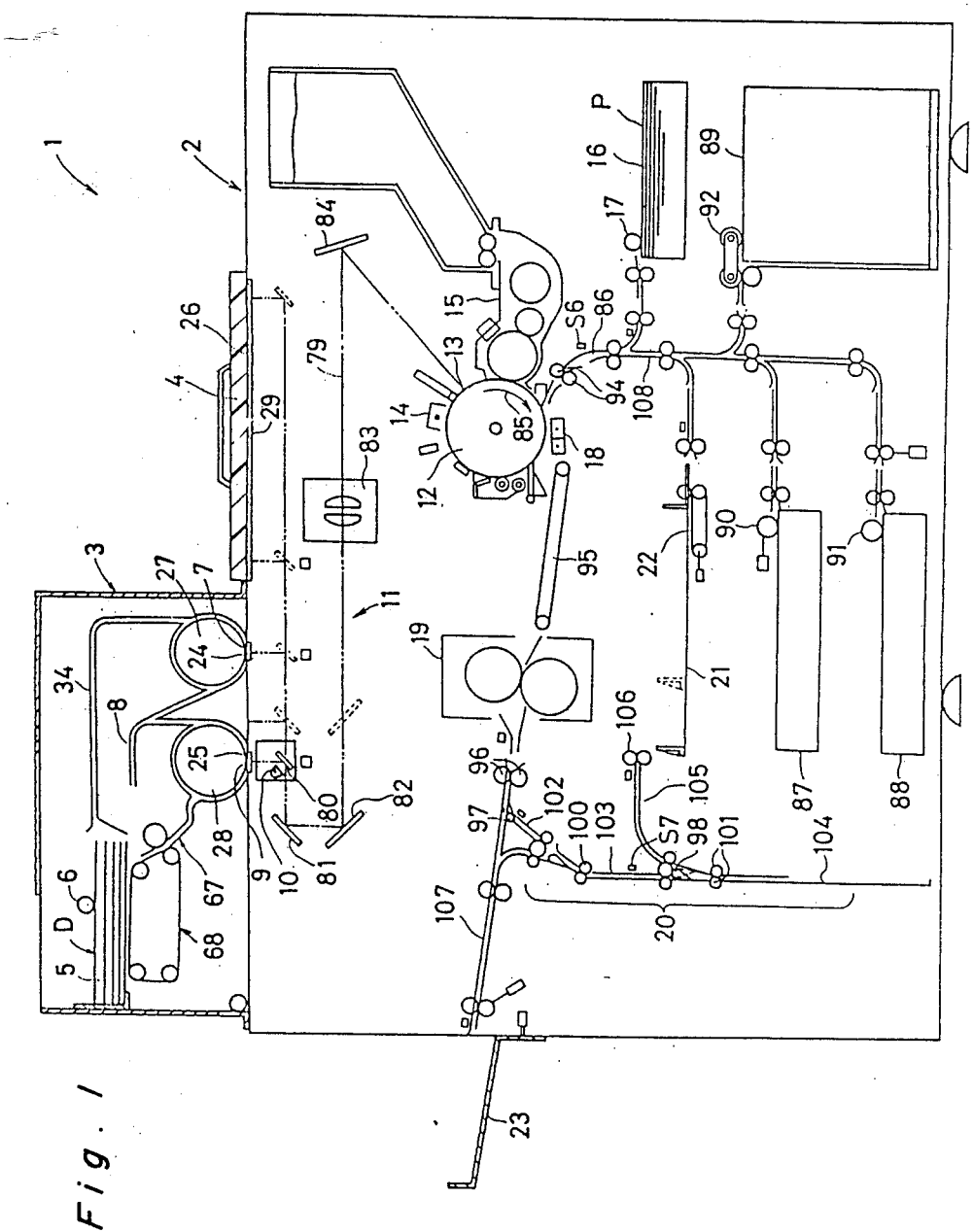
FIG. 1 is a schematic side sectional view of a copying machine equipped with a recirculating document handing mechanism (RDH), which machine is utilized in the prior art system as well as in the system of the present invention.

Before the description of the present invention proceeds, it is to be noted that like parts are designated by like reference numerals throughout the accompanying drawings. It is also to be noted that the copying machine equipped with the recirculating document handling mechanism shown in and described with reference to FIG. 1 in connection with the prior art examples can be utilized in the practice of the present invention.

Referring to FIG. 1, there is schematically shown an electrophotographic copying machine 1 which comprises the machine housing 2 having a first transparent plate 24 that defines the first reading station 7, a second transparent plate 25 that defines the second reading station 9, the recirculating document handling mechanism 3 and the document pressure plate 4 for covering and pressing a document having a substantial thickness, all mounted atop the machine housing 2. In addition to the first and second transparent plates 24 and 25, a third transparent plate 26 is also mounted atop the machine housing 2 in register with the pressure plate 4 to support thereon the document to be copied. The pressure plate 4 defines a third reading station and is supported for pivotal movement between opened and closed positions and, when in the closed position, covers and presses the document against the third transparent plate 26.

The first transparent plate 24 defining the first reading station 7 is positioned immediately below a first support barrel 27 of right cylindrical shape forming a part of the recirculating document handling mechanism 3. On the other hand, the second transparent plate 25 defining the second reading station 9 is positioned immediately below a second support barrel 28 of right cylindrical shape forming another part of the recirculating document handling mechanism 3.

Figure 2:
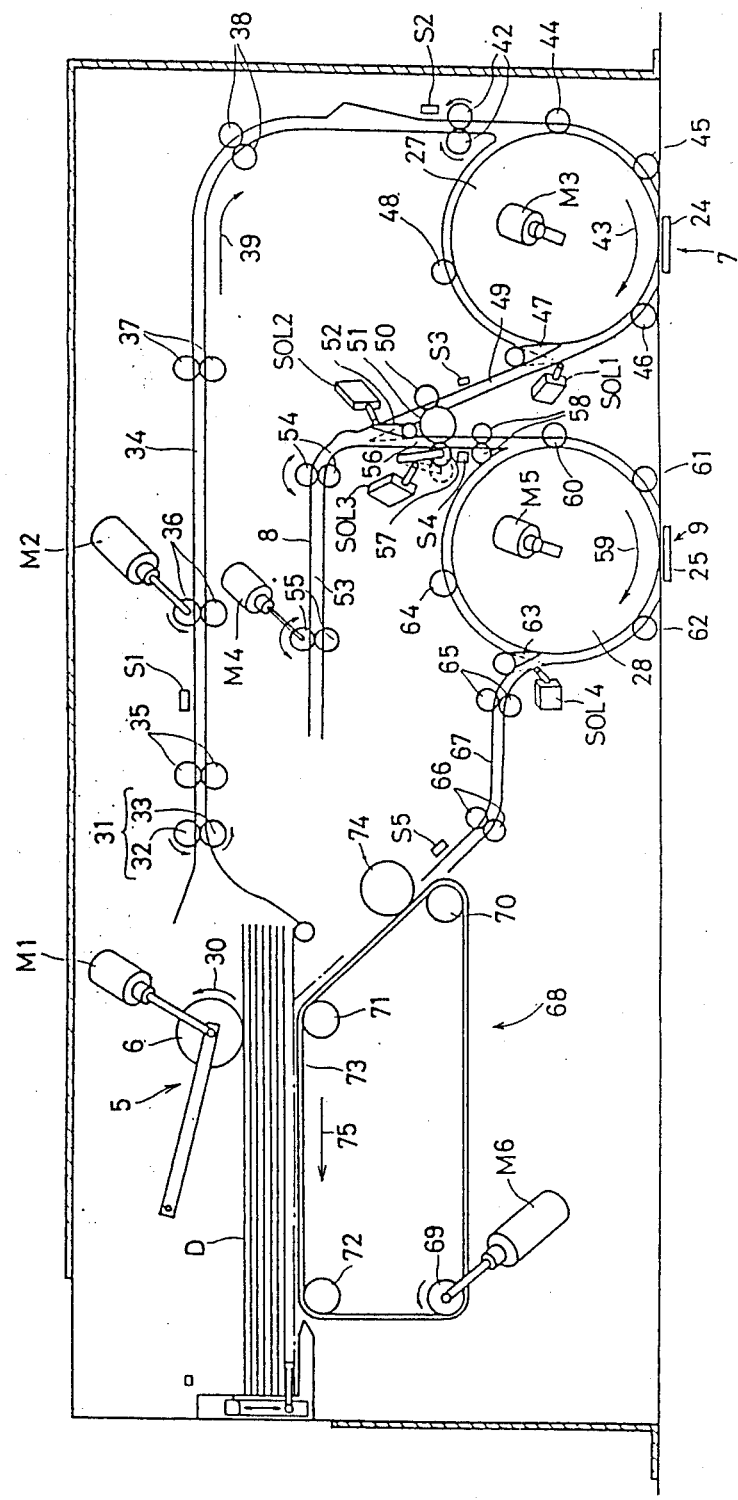
FIG. 2 is a schematic side sectional view, on an enlarged scale, of the recirculating document handing mechanism shown in FIG. 1.

The details of the recirculating document handling mechanism 3 are best shown in FIG. 2. The stack of documents D accommodated in the document tray 5 are successively drawn out from the document tray 5 one at a time in the order from the uppermost member of the documents D by the action of the document feed roller 6, driven by a motor M1 in a direction shown by the arrow 30, and is then fed towards a ruffling roller assembly 31 comprised of upper and lower rollers 32 and 33 adapted to be driven in the same direction so that only a single document can be transported therethrough.

Four transport roller pairs 35, 36, 37 and 38 are disposed along a transport passage 34. All of these transport roller pairs 35 to 38 are operatively coupled so that, when a motor M2 drives one of the transport roller pairs, for example, the transport roller pair 36 as shown, the remaining roller pairs 35, 37 and 38 can be driven in synchronism with the roller pair 36. By the action of these transport roller pairs 35 to 38, the document D can be transported along the document transport passage 34 in a direction shown by the arrow 39. The document transport passage 34 has a plurality of detector elements S1 and S2, for example, photoelectric detector elements, disposed therealong in spaced relationship with each other in the detection of the passage of the document D therethrough. In the vicinity of an exit of the document transport passage 34 adjacent the first support barrel 27, a registering roller pair 42 is disposed, one of the registering rollers 42 being adapted to be drivingly coupled with a drive shaft (not shown) through a clutch. By controlling ON and OFF states of the clutch, the registering roller pairs 42 can be selectively driven and halted thereby to control the timing at which, the document D can be transported to the first support barrel 27. The control of the timing at which the document D is transported towards the first support barrel 27 is carried out in synchronism with the control of the timing at which the copying paper P is transported towards the photoreceptor drum 12. Accordingly, as will be described later, the arrival at a transfer station of a visible toner image corresponding to the electrostatic latent image on the photoreceptor drum 12, which has been formed as a result of the scanning of an image on one side of the document D, can be synchronized with the arrival of the copying sheet P at the transfer station so that the visible toner image can be transferred onto the copying sheet P in the right position.

The first support barrel 27 has its outer peripheral surface formed with suction ports that are communicated with a suction means through the hollow of the first support barrel 27. Therefore, when and so long as the suction means is in operation, the document D transported to the first support barrel 27 can be retained on the outer peripheral surface of the first support barrel 27 while turned therearound. This first support barrel 27 is adapted to be driven by a motor M3 so as to rotate in one direction shown by the arrow 43 and, therefore, the document D turned around and retained on the first support barrel 27 is, while sandwiched between the first support barrel 27 and follower rollers 44 and 45, moved immediately above the first transparent plate 24 so that one of the sides of the document 27 can be scanned by the illuminator lamp 10, shown in FIG. 1. Imagewise rays of light reflected from such one side of the document D are transmitted through the first transparent plate 24 and in turn projected onto the photoreceptor drum 12 in the manner as hereinbefore described and is well know.

The document D having one side having been scanned at the first reading station 7 immediately above the first transparent plate 24 is, while sandwiched between the first support barrel 27 and a follower roller 46, moved past a deflector pawl 47, which is supported for pivotal movement between solid-line and phantom positions. When and long as the deflector pawl 47 is held in the phantom position shown by the phantom line in FIG. 2, the document D can be, while sandwiched between the first support barrel 27 and a follower roller 48, transported again to the first reading station 7 so that the same side of the document D can be again scanned. On the other hand, when, the deflector pawl 47 is switched over to the solid-line position shown by the solid line in FIG. 2, the document D can be transported through a transport passage 49 towards the document inverting means 8. The switching in position of the deflector pawl 47 between the solid-line and phantom positions can be accomplished by the operation of a solenoid unit SOL1.

The document inverting means 8 comprises a detector element S3, a pair of transport rollers 50 and 51, a deflector pawl 52, a transport passage 53 and a pair of reversible transport rollers 54 and 55. The document D transported into the transport passage 49 is in turn transported by the transport rollers 50, 51, 54 and 55 into the transport passage 53 in the document inverting means 8. During the transport of the document D into the transport passage 53, the deflector pawl 52 is held at a position shown by the phantom line in FIG. 2. When a leading end of the document D with respect to the direction of transport thereof through the transport passage 49 moves past the detector element S3, and after a predetermined time subsequent to the detection of the passage of the leading end of the document D past the detector element S3, an operation for turning the document D upside down is initiated. In other words, the transport rollers 54 and 55 are driven by a motor M4 in a direction required for the document D to be moved back towards the position where the deflector pawl 52 is installed and, at the same time, the deflector pawl 52 is switched over to another position shown by the solid line in FIG. 2, wherefore the document D can be transported past the deflector pawl 52 towards a transport passage 56. The switching in position of the deflector pawl 52 can be accomplished by the operation of a solenoid unit SOL2.

The document transported into the transport passage 56 is, while sandwiched between the roller 51 and a transport roller 57 supported for movement close to and away from the roller 51 and rotatable in contact with the roller 51, transported towards the second support barrel 28. The movement of the roller 57 in a direction close to and away from the roller 51 can be controlled by the operation of a solenoid unit SOL3. When the passage of the trailing end of the document D with respect to the direction of transport thereof towards the second support barrel 28 past the transport rollers 51 and 57 is detected by a detector element S4, a registering roller pair 58 is controlled in a manner similar to the registering roller pair 42 with the document D consequently transported to the second support barrel 28.

The second support barrel 28 is of a construction generally identical with the first support barrel 27 and is adapted to retain the document D on the outer peripheral surface thereof by means of a suction force developed by a similar suction means. This second support barrel 28 is adapted to be driven by a motor M5 in one direction shown by the arrow 59, and the document D retained on the outer peripheral surface of the second support barrel 28 is, while sandwiched between the second support barrel 28 and follower rollers 60 and 61, moved past the second reading station 9 immediately above the second transparent plate 25. Since at this time the document D has been turned upside down by the document inverting means 8, the opposite side of the document D is presented to the second reading station 9. For scanning such other opposite side of the document D, the optical system 11 (See FIG. 1) including the illuminator lamp 10, is moved from a first position in register with the first reading station 7 to a second position in register with the second reading station 9. With the optical system 11 held at the second position, this other opposite side of the document D, this time presented to the second reading station 9, can be scanned by the illuminator lamp 10 so that an image on this other opposite side of the document D can be eventually formed on the copying sheet in a manner well know to those skilled in the art.

The document having such other side scanned at the second reading station 9 immediately above the second transparent plate 25 is, while sandwiched between the second support barrel 28 and a follower roller 62, transported towards a deflector pawl 63. So long as the deflector pawl 63 is held at a phantom position shown by the phantom line in FIG. 2, the document D can be, while sandwiched between the second support barrel 28 and a follower roller 64, transported again to the second reading station 8 so that the same side of the document D can be again scanned. On the other hand, when the deflector pawl 63 is switched over to the solid-line position shown by the solid line in FIG. 2, the document D can be transported towards a transport passage 67 by the action of roller pairs 65 and 66. The switching in position of the deflector pawl 63 between the solid-line positions can be accomplished by the operation of a solenoid unit SOL4.

The document D transported into the transport passage 67 is subsequently transported towards the document tray 5 by means of a delivery means 68 which comprises a drive roller 69 and three driven rollers 70, 71 and 72, a generally endless delivery belt 73 trained around these rollers 69 to 72, and a follower roller 74 adapted to sandwich the document D between it and a portion of the delivery belt 73. When the leading end of the document D with respect to the direction of transport thereof towards the document tray 5 along the transport passage 67 moves past a detector element S5, the drive roller 69 is driven by a motor M6 so as to drive the delivery belt 73 in one direction shown by the arrow 75. The document D is, therefore, while sandwiched between that portion of the delivery belt 73 and the follower roller 74, transported towards the document tray 5 and is inserted in between the bottom of the document tray 5 and the lowermost member of the stacked documents in the document tray 5. In this way, both opposite sides of each document D can be scanned at the first and second reading stations 7 and 9 successively.

When the document presented at one of the first reading station 7, the second reading station 8 and the third reading station 29 is scanned by the illuminator lamp 10, imagewise rays of light reflected therefrom are projected by means of the optical system 11 and along an optical path 79 onto the photosensitive surface of the photoreceptor drum 12 at the exposure station 13 to form an electrostatic latent image thereon. This optical system 11 may be of any known construction and, as so far illustrated, comprises, in addition to the illuminator lamp 10, reflector mirrors 80, 81 and 82, a zoom lens assembly 83 and a reflector mirror 84.

Referring again to FIG. 1, during each complete rotation of the photoreceptor drum 12, the photosensitive surface of the photoreceptor drum 12 is moved sequentially past the charging station at which the photosensitive surface is electrostatically charged by the primary corona discharger 14; the exposure station 13 at which the imagewise rays of light reflected from the document presented to any one of the first reading station 7, the second reading station 9 and the third reading station 29 and therefore carrying the image of the document are projected onto the photosensitive surface to form an electrostatic latent image thereon; a developing station at which the developing unit 15 is disposed for developing the electrostatic latent image into a visible toner image; the transfer station at which the transfer corona discharger 18 is installed for assisting the transfer of the visible toner image onto a copying sheet P which has been supplied from the supply cassette 16 towards the transfer station by the sheet feed roller 17 by way of a transport passage 86; a separating station at which the copying sheet having the visible toner image transferred thereto is separated from the photoreceptor drum 12; and a cleaning station at which residue toner and residue electrostatic, charge, both remaining on the photosensitive surface of the photoreceptor drum 12, can be removed in readiness for the next cycle of copying operation.

It is to be noted that the illustrated copying machine includes, in addition to the sheet supply cassette 16, sheet supply cassettes 87, 88 and 89 for accommodating respective batches of copying sheets of different sizes, which cassettes 16, 87, 88 and 89 are selectively brought into operation one at a time so that the copying sheets of selected size can be successively supplied towards the sheet transport passage 86 by means of the sheet feed roller 17, 90, 91 or 92.

The transport passage 86 has a detector element S6 and a registering roller pair 94 both installed therealong. Therefore, when the leading end of the copying sheet P with respect to the direction of transport thereof towards the photoreceptor drum 12 along the transport passage 86 is moved past the detector element S6, the rotation of the registering roller pair 94 is so controlled simultaneously with the control of the registering roller pair 42 or 58 in the recirculating document handling mechanism 3 that the arrival of the copying sheet P at the transfer station can be synchronized with the arrival of the visible toner image, carried by the photoreceptor drum 12, at the transfer station.

The copying sheet P which has been separated from the photoreceptor drum 12 at the separating station is conveyed towards the fixing unit 19 through a conveyance means 95. When simplex copying is done on the copying sheet, the copying sheet P having passed through the fixing unit 19 is subsequently ejected onto the copy receiving tray 23 through an ejecting passage 107. However, when duplex copying is to be done on the copying sheet P, the copying sheet P, having passed through the fixing unit 19 is delivered into the sheet inverting means 20 without being ejected onto the copy receiving tray 23.

The sheet inverting means 20 includes a branch passage 102 branched off from the ejecting passage 107, a first delivery passage 103, a second delivery passage 104, a third delivery passage 105, a first deflector pawl 97 disposed at the junction between the branch passage 102 and the ejecting passage 107, a second deflector pawl 98 disposed at the junction between the first, second and third delivery passages 103, 104 and 105, a delivery roller pair 100 disposed along the first delivery passage 103, and a reversible delivery roller pair 101 disposed along the second delivery passage 104. When duplex copying is to be made on the copying sheet P, the first deflector pawl 97 is held at a phantom position shown by the phantom line in FIG. 1 and, therefore, the copying sheet having one side copied with the image of one side of the document is guided into the branch passage 102 and is then transported by the deliver roller pair 100 towards the first delivery passage 103. Also, since the second deflector pawl 98 is held at a phantom position shown by the phantom line in FIG. 1 at this time, the copying sheet P can be further delivered into the second delivery passage 104. When the trailing end of the copying paper P with respect to the direction of transport thereof towards the second delivery passage 104 moves past a detector element S7, and after a predetermined time subsequent to the passage of the trailing end of the copying sheet P past the detector element S7, the delivery roller pair 101 are reversibly driven in a direction required for the copying sheet P to be transported back towards the first delivery passage 103. However, since at this time the second deflector pawl 98 is switched over to a solid-line position shown by the solid line in FIG. 1, the copying sheet P tending to be transported from the second delivery passage 104 towards the first delivery passage 104 as a result of the reversed rotation of the delivery roller pair 101 is guided into the third delivery passage 105 and is then supplied onto the intermediate tray 21 by means of a drawing roller pair 106.

The copying sheet P once accommodated within the intermediate tray 21 is again supplied by the sheet feed roller 22 into the transport passage 86 by way of the transport passage 108. The copying sheet P so transported into the transport passage 86 is subsequently delivered towards the photoreceptor drum 12 by the registering roller pair 94 for receiving a visible toner image on the other side of the copying sheet P. In this way, images of either side of the document D or one side of the respective documents D can be copied on the respective opposite sides of the copying sheet P, which sheet P is subsequently transported through the ejecting passage 107 onto the copy receiving tray 23. At this time, the first deflector pawl 97 has been switched over to the solid-line position shown by the solid line in FIG. 1.

Figure 3:
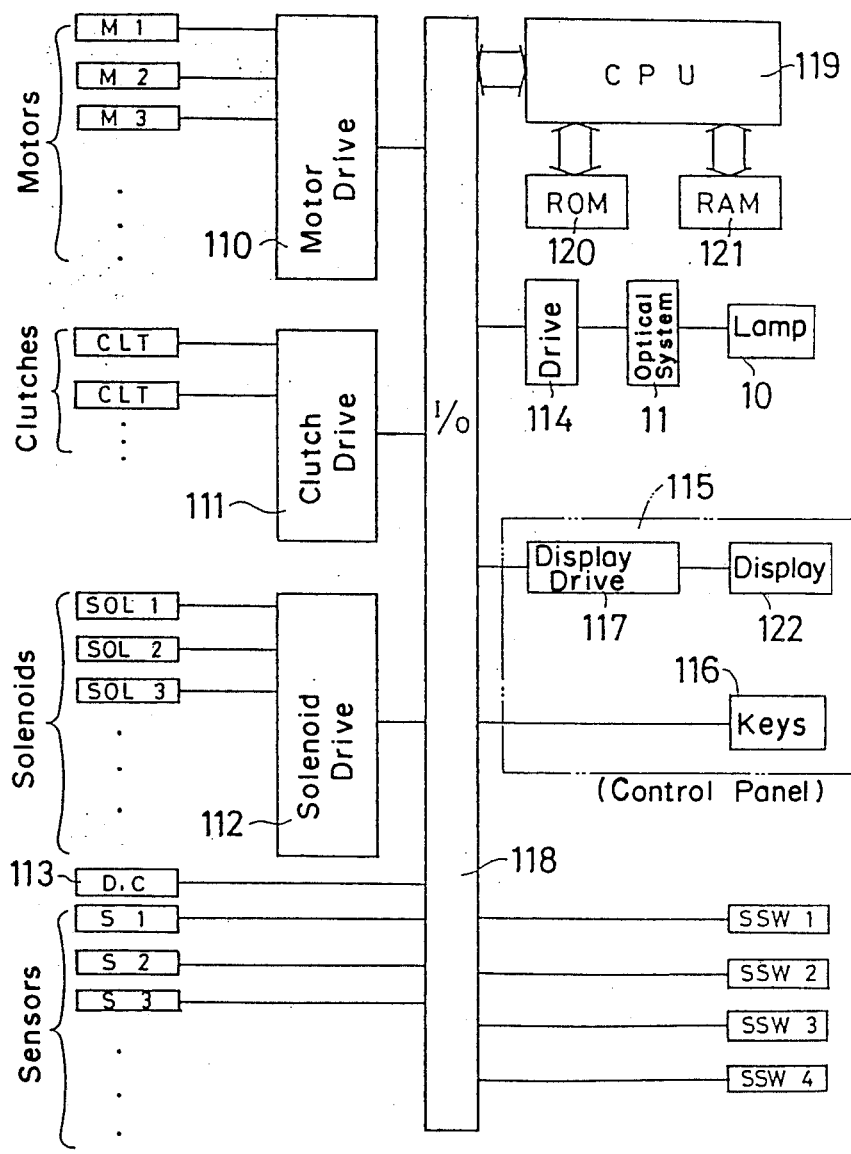
FIG. 3 is a circuit block diagram showing an electric control device for controlling both the copying machine and the recirculating document handing mechanism.

FIG. 3 illustrates a block circuit diagram of a control unit used to control both of the copying machine 1 and the recirculating document handling mechanism 3. As shown therein, the various drive motors such as designated by M1, M2, M3 and so on for driving the transport rollers and the support barrels are electrically connected with a motor drive circuit 110; the various clutches for controlling the synchronism between the transportation of the document D within the recirculating document handling mechanism 3 and the transportation of the copying sheet within the machine housing 2 are electrically connected with a clutch drive circuit 111; and the various solenoid units such as designated by SOL1, SOL2 and so on for activating the various deflector pawls in the associated transport and delivery passages are electrically connected with a solenoid drive circuit 112. These drive circuits 110, 111 and 112 as well as a direct current power source (D.C.) 113, and the various detector elements, such as designated by S1, S2 and so on for detecting the document D and the copying sheet P being transported, as well as an optical system drive circuit 114 for driving the optical system 11, various keys 116 disposed on a control panel 115 on the machine housing 2 and a display drive circuit 117 for driving display devices disposed on the control panel 115 are electrically connected with an input/output interface circuit 118.

The interface circuit 118 is in turn connected with a central processing unit (CPU) 119 comprised of a microcomputer for outputting respective detection signals from the various detector elements and also for controlling the various drive circuits 110, 111, 112, 114 and 117 in response to control signals outputted from the central processing unit 119. The central processing unit 119 is connected with a read-only memory ROM) 120 and a random access memory (RAM) 121 and performs a control operation according to a control program stored in the read-only memory 120. The random access memory 121 is used as a work area for various counters and timers necessitated to control the copying operation. The interface circuit 118 is operable to drive the optical system 11 through the optical system drive circuit 114 and also to control the selective switching on and off of the illuminator lamp 10 at each of the first, second and third reading stations 7, 9 and 29. Also, the interface circuit 118 is adapted to receive input signals from the keys 116 on the control panel 115 and to activate the display drive circuit 117 so that the status of the copying operation then taking place can be indicated by means of the display devices 122 on the control panel 116. This interface circuit 118 is also connected with select switches SSW1, SSW2, SSW3 and SSW4 for selecting one of the copying modes which may include a simplex-to-simplex mode in which an image on one side of a simplex document can be copied on one side of a copying sheet, a simplex-to-duplex mode in which an image on one side of each of two simplex documents can be copied on opposite sides of one copying sheet, a duplex-to-simplex mode in which images on the opposite sides of a duplex document can be copied on one side of a copying sheet, and a duplex-to-duplex mode in which images on the opposite sides of a duplex document can be copied on the opposite sides of a copying sheet FIG. 4, comprised of FIGS. 4(a) to 4(f), illustrates the sequence of making the copies from a plurality of documents, for example, the first and second duplex documents Da and Db, performed with the use of the copying machine 1 equipped with the recirculating document handling mechanism 3 according to the present invention.

Figure 4A:
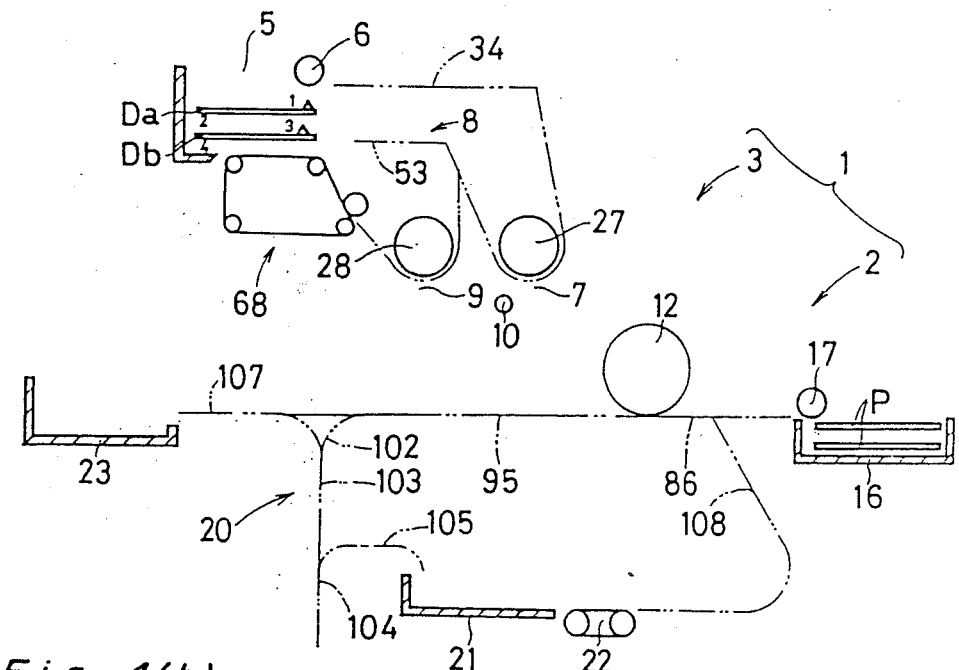
FIG. 4, comprised of FIGS. 4(a) to 4(f), illustrates the sequence of duplex copying executed according to one preferred embodiment of the present invention.

As shown in FIG. 4(a), the documents D to be successively copied are placed on the document tray 5 in a stacked form and in the sequentially paginated order with the initial page placed atop the stack of the documents. A batch of copying sheets P is accommodated within the sheet supply cassette 16 in a stacked form.

Figure 4B:
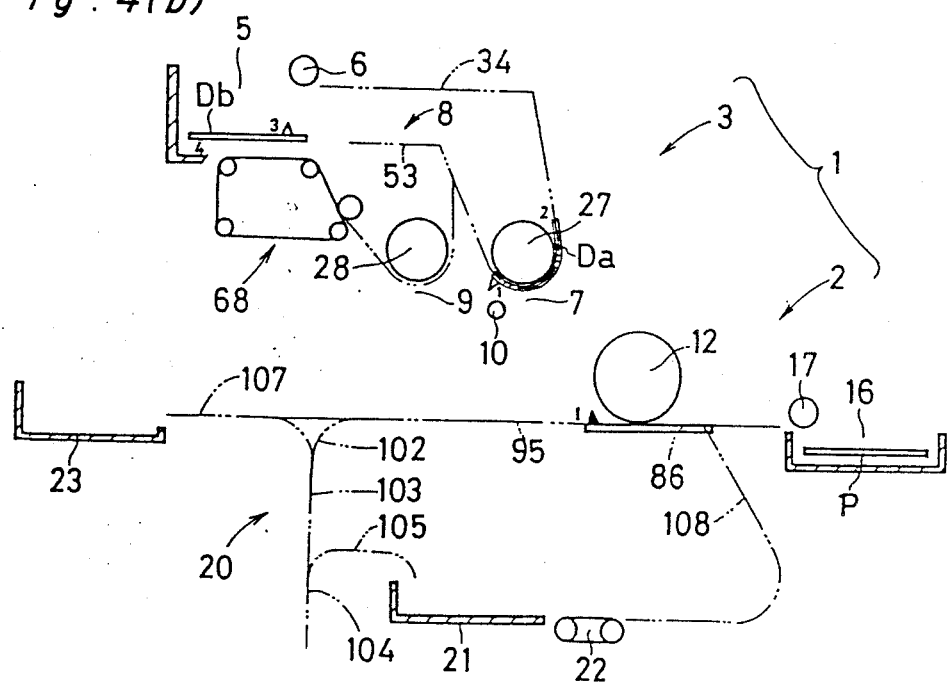

When copying is initiated, as shown in FIG. 4(b), the document feed roller 6 is brought into contact with the first document Da placed on the top of the stack of documents D within the document tray 5 so that the first document Da can be delivered into the transport passage 34. The first document Da in the transport passage 34 is supported by the first support barrel 27 and is moved past the first reading station 7 at which the first page Da1 of the first document Da is scanned, that is, illuminated by the illuminator lamp 10, so that an image on the first page Da1 can be subsequently projected onto the photosensitive surface of the photoreceptor drum 12 to form an electrostatic latent image thereon The electrostatic latent image so formed is thereafter developed into a visible toner image which is in turn transferred at the transfer station onto one side of the copying sheet Pa.

Figure 4C:
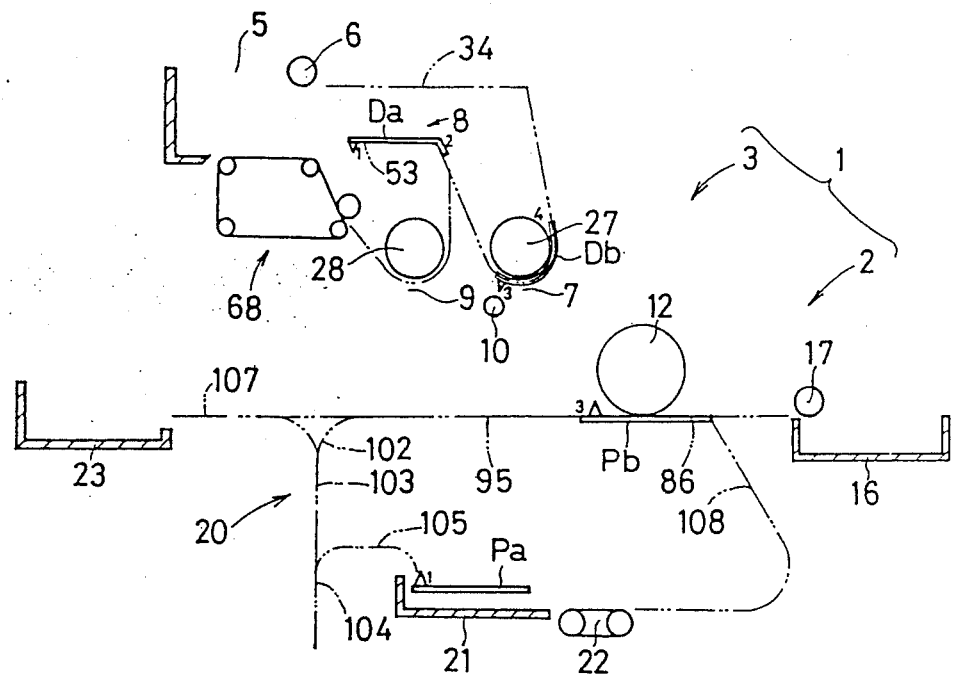

Then, as shown in FIG. 4(c), the first document Da having its first page Da1 scanned at the first reading station 7 is subsequently transported to the transport passage 53 of the document inverting means 8 and, on the other hand, the first copying paper Pb is transported through the transport means 95 to the fixing unit 19 at which the visible toner image transferred onto the first copying sheet Pa in the manner as hereinabove described can be permanently fixed thereon. The copying sheet Pa having the image permanently fixed thereon is subsequently delivered to the sheet inverting means 20.

Within the sheet inverting means 20, the first copying sheet Pa is transported through the delivery passages 102, 103, 104 and 105 towards the intermediate tray 21. When the trailing end of the first document Da being transported towards the document inverting means is moved past the first reading station 7, the second document DB accommodated in the document tray 5 is drawn out from the document tray 5 by the feed roller 6 and is then transported towards the first support barrel 27 through the transport passage 34. At this time, the first document Da is held within the document inverting means 8 while the first copying sheet Pa is held in a condition ready to move past the intermediate tray 21 and then to be transported by the feed roller 22 onto the transport passage 86 again. During a period in which the first document Da is held within the document inverting means 8, the second document Db is supported around the second support barrel 27 so as to move past the first reading station 7. At the first reading station 7, the third page Db3 of the second document Db is illuminated by the illuminator lamp 10 so that an image on the third page Db3 of the second document Db can be projected onto the photosensitive surface of the photoreceptor drum 12 to form an electrostatic latent image thereon, which latent image is subsequently developed into a visible toner image. This visible toner image is then transferred at the transfer station onto one side of the second recording sheet Pb which has been supplied to the transfer station from the sheet cassette 16 by means of the feed roller 17.

Figure 4D:
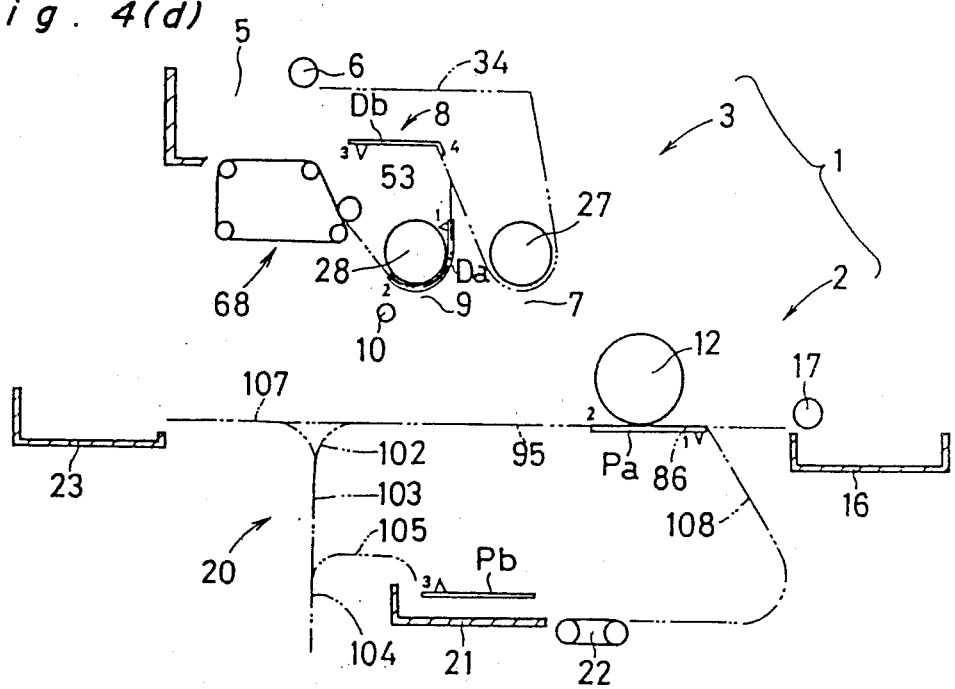

The second document Db having one side forming the third page Db3 which has been scanned at the first reading station 7 is thereafter transported to the document inverting means 8 as shown in FIG. 4(d). The first document Da held in the document inverting means 8 before the second document Db is transported into the document inverting means 8 is transported to the second support barrel 28, conceding the document inverting means 8 to the second document Db. In other words, after the first document Da has moved past the document inverting means 8, the second document Db is transported into the document inverting means 8. The second recording sheet Pb having one side, that is, the third page Db3, onto which the visible powder image has been transferred is transported through the transport means 95 to the fixing unit at which such visible toner image is permanently fixed, and is thereafter delivered to the intermediate tray 21 through the delivery passages 102 to 105 of the sheet inverting means 20.

The first document Da transported to the second support barrel 28 is, while turned therearound, moved past the second reading station 9. At this second reading station 9, the opposite side, that is, the second page Da2, of the first document Da is illuminated by the illuminator lamp 10 of the optical system that has been moved from the first reading station 7 so that an image of the second page Da2 of the first document Da can be projected onto the photosensitive surface of the photoreceptor drum 12 to form an electrostatic latent image. This electrostatic latent image is subsequently developed into a visible toner image which is transferred at the transfer station onto the other side of the first copying sheet Pa which has been transported to the transfer station by the feed roller 22 through the transport passage 108 and then through the transport passage 86.

Figure 4E:
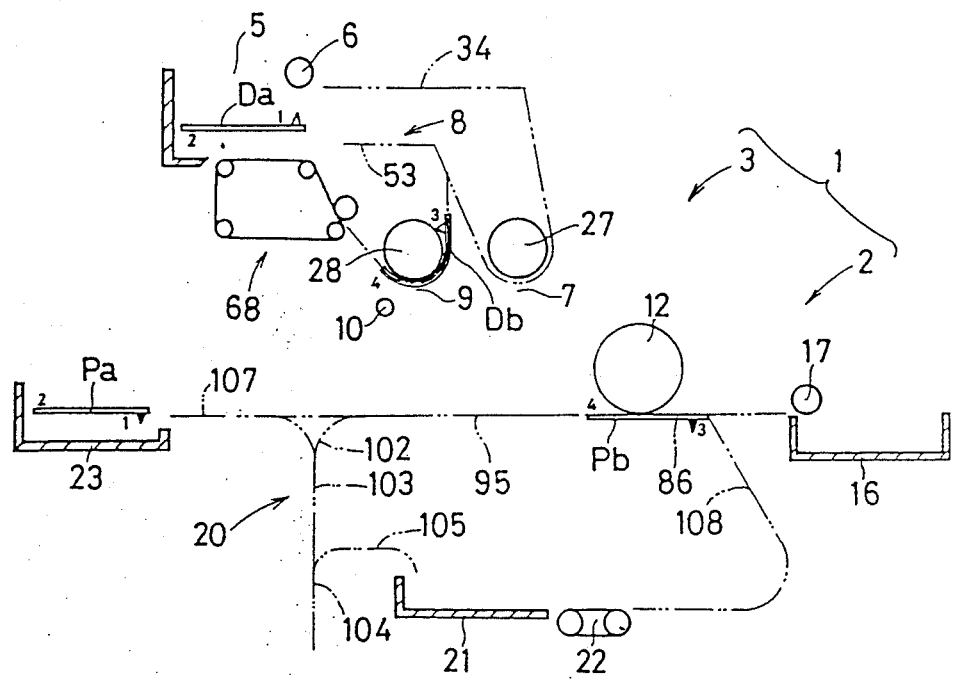

After the second page Da2 of the first document Da has been scanned at the second reading station 9, as shown in FIG. 4(e), the first document Da is returned to the document tray 5 via the document delivery means 68 in the manner as hereinbefore described. On the other hand, the first copying sheet Pa having its opposite sides copied with the respective images is, without being delivered into the sheet inverting means 20, ejected through the transport means 95 onto the copy receiving tray 23.

When the trailing end of the first document Da being transported moves past the second reading station 9, the second document Db temporarily held in the document inverting means 8 is transported towards the second support barrel 28. While retained by the second support barrel 28, the second document Db is moved past the second reading station 9. At this second reading station 9, the other side, that is, the fourth page Db4, of the second document Db, is scanned with an image of the fourth page Db4 consequently projected onto the photosensitive surface of the photoreceptor drum 12 to form an electrostatic latent image. This electrostatic latent image corresponding to the image on the fourth page Db4 of the second document Db is subsequently developed into a visible toner image which is eventually transferred onto the opposite side of the second copying sheet Pb then transported from the intermediate tray 21 by means of the feed roller 22 via the transport passage 108 and then via the transport passage 96.

The second document Db having been scanned at the second reading station 9 is returned to the document tray 5 through the document delivery means 68 and is inserted in between the bottom of the document tray 5 and the lowermost sheet of the stack of the documents D. On the other hand, the second copying sheet having the images copied on the opposite sides thereof is, without being delivered to the sheet inverting means 20, ejected through the ejecting passage 107 onto the copy receiving tray 23 and stacked above the first copying sheet Pa then resting on the copy receiving tray 23. In this wa the duplex copying of the two documents Da and Db is completed. Accordingly, the first duplex copy will show that the respective images of the first and second pages Da1 and Da2 of the first document Da are copied on the opposite sides of the first copying sheet Pa, and the second duplex copy will show that the respective images of the third and fourth pages Db3 and Db4 of the second document Db are copied on the opposite sides of the second copying sheet Pb.

Figure 4F:
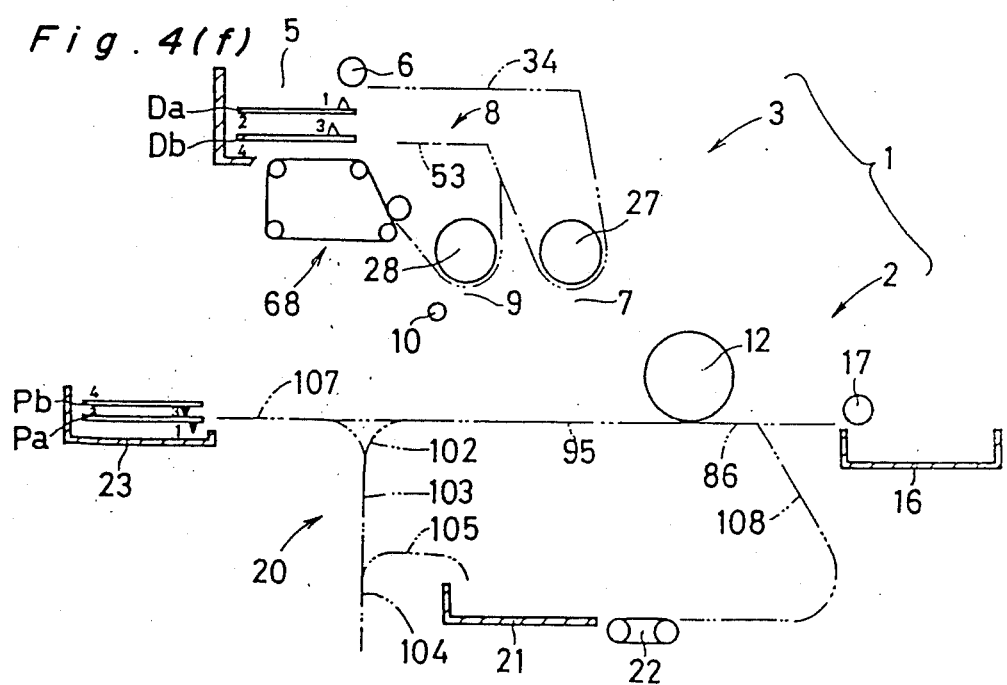
Figure 5:
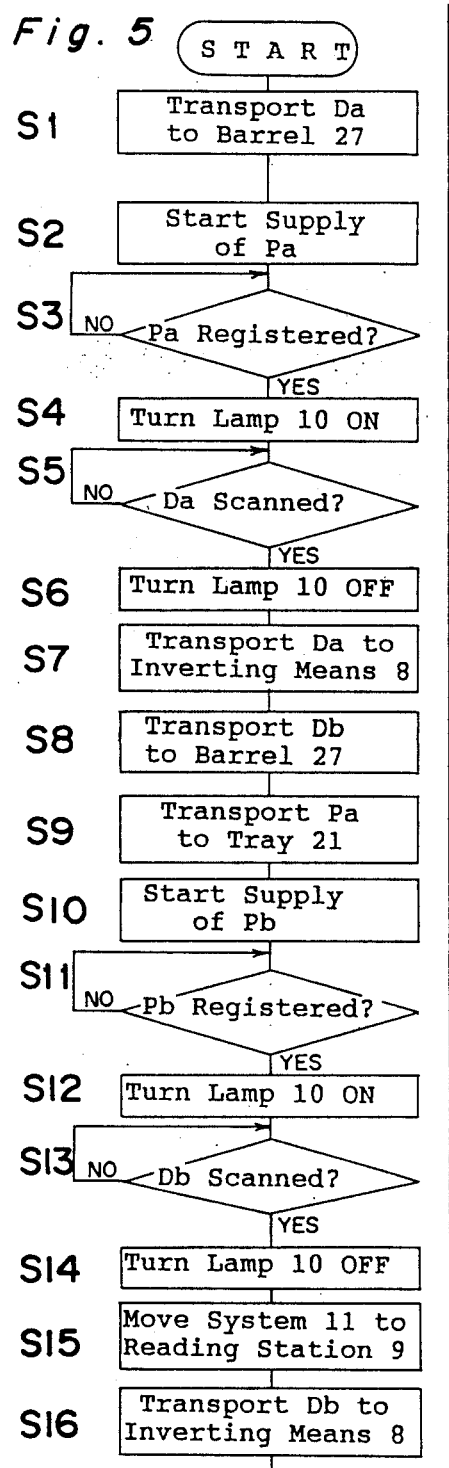
FIG. 5 is a flowchart showing a program executed in the copying machine, equipped with the recirculating document handling mechanism, to make duplex copies from duplex documents.
Figure 5:
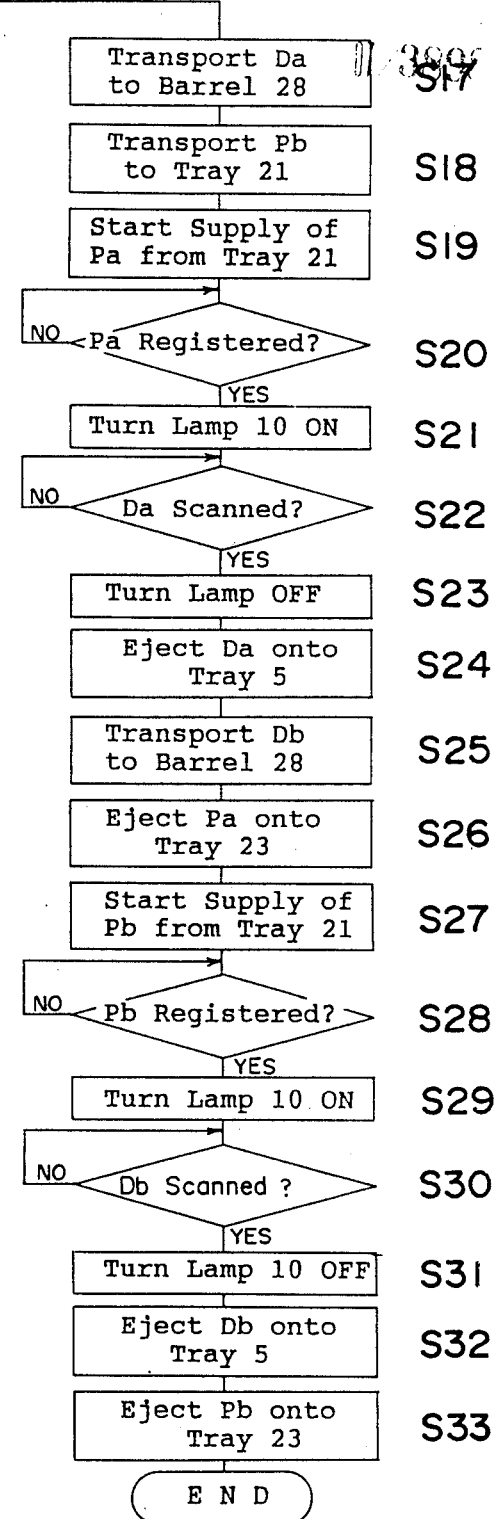
Figure 6A:
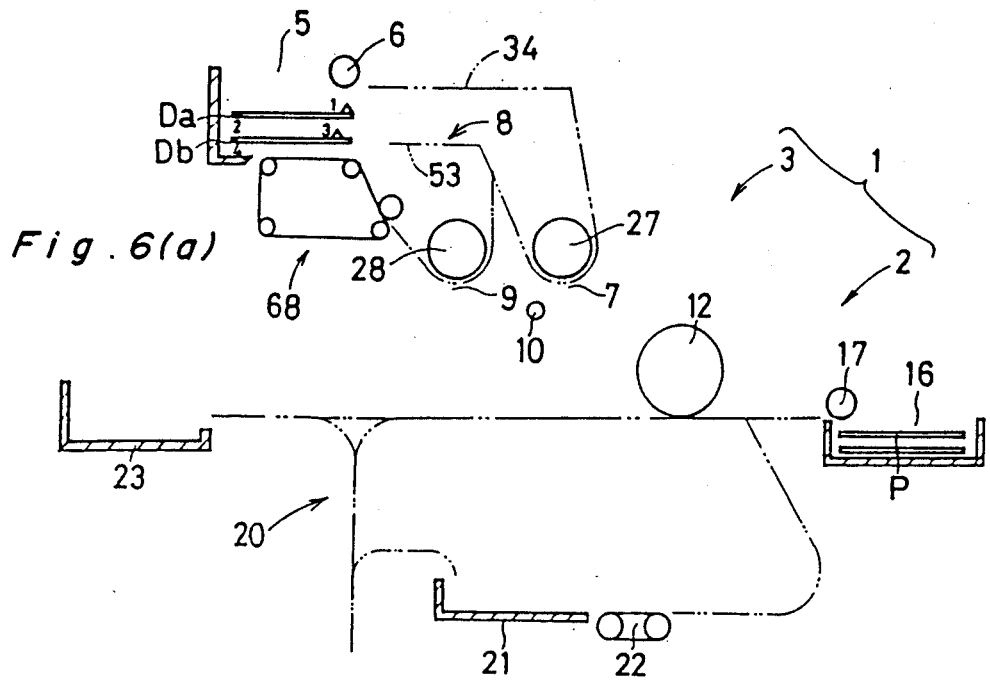
FIG. 6, comprised of FIGS. 6(a) to 6(h), illustrates the sequence of making duplex copies from simplex documents according to one example.
Figure 6B:
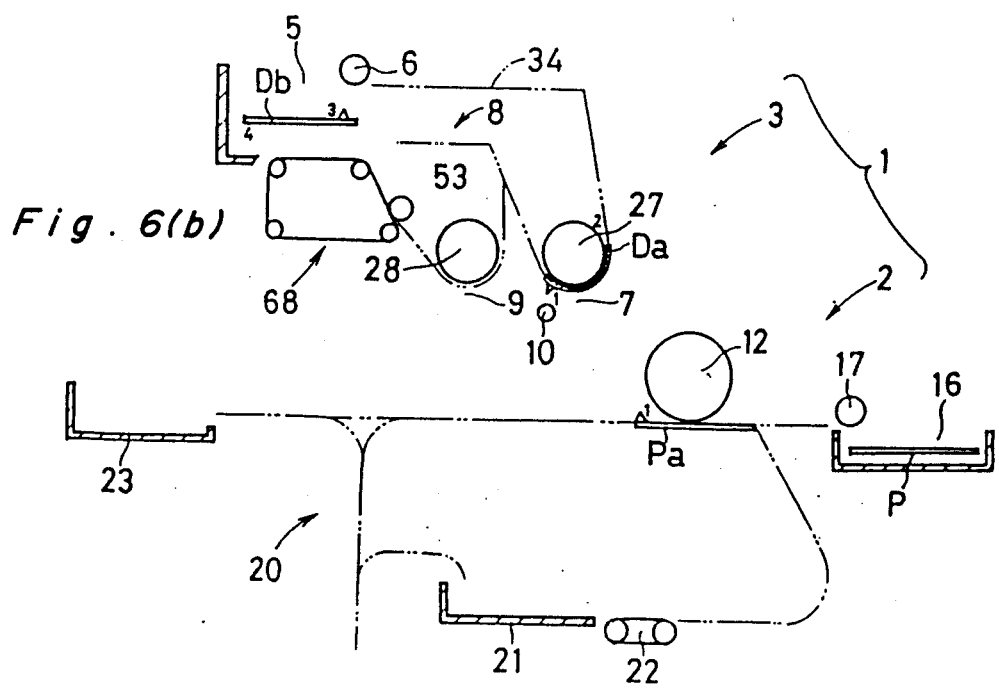
Figure 6C:
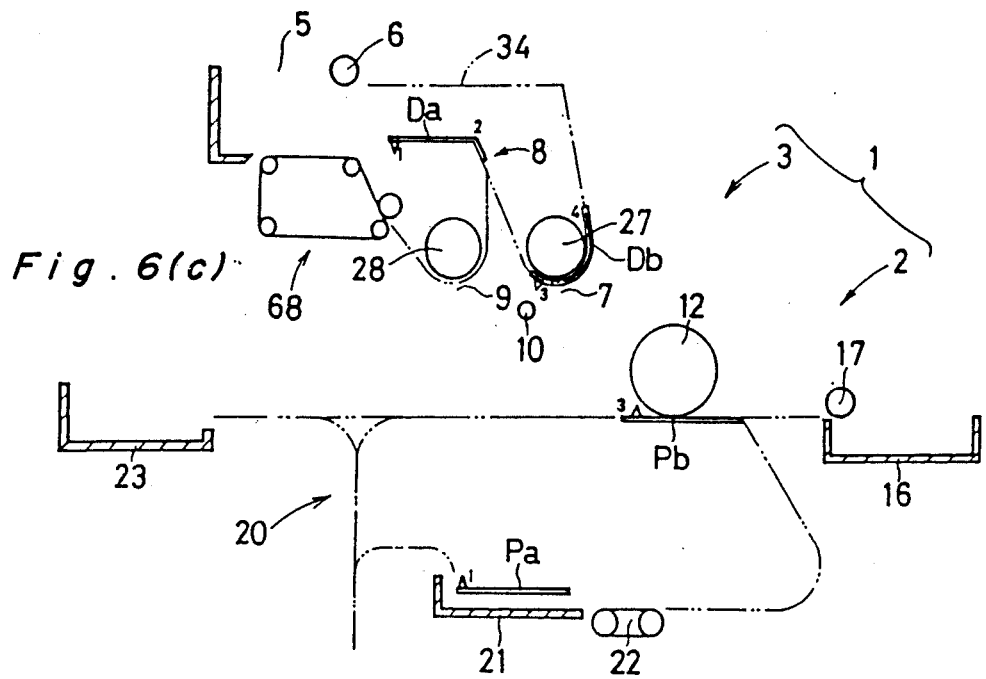
Figure 6D:
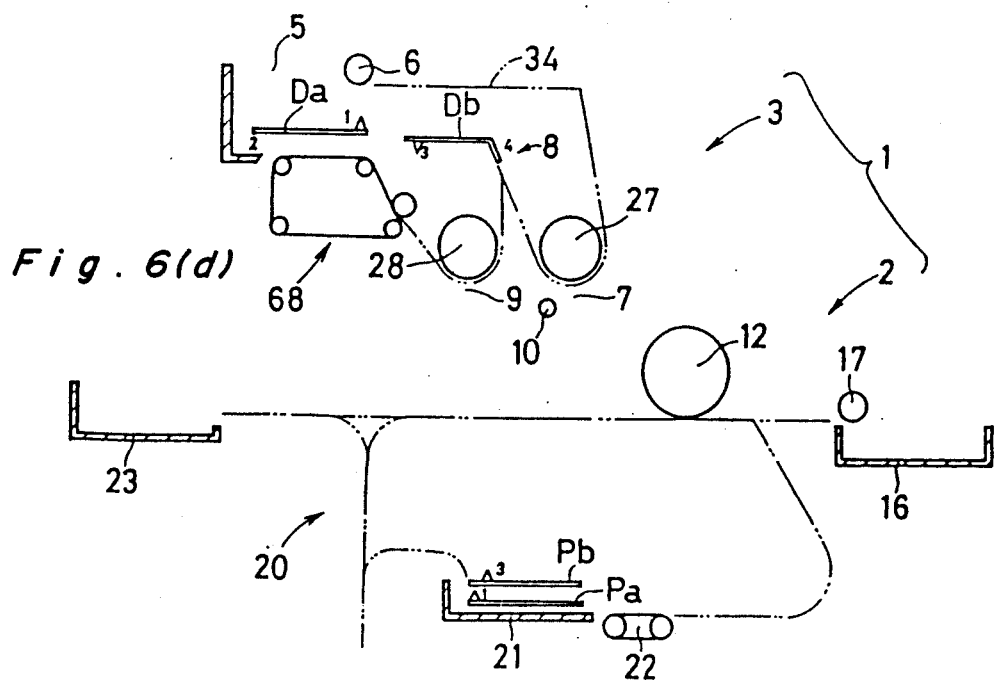
Figure 6E:
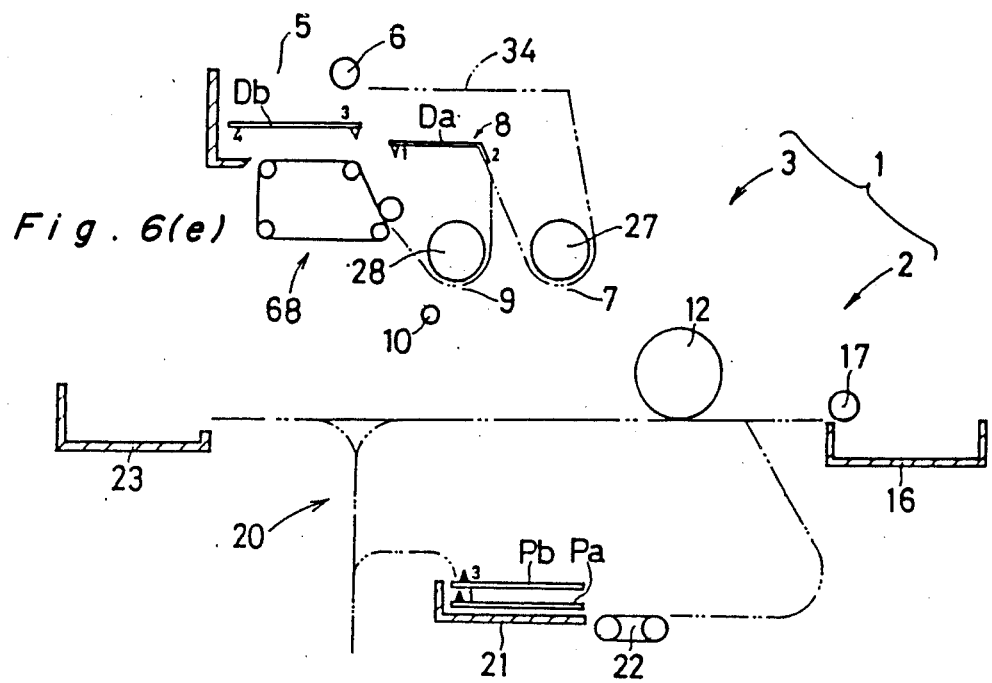
Figure 6F:
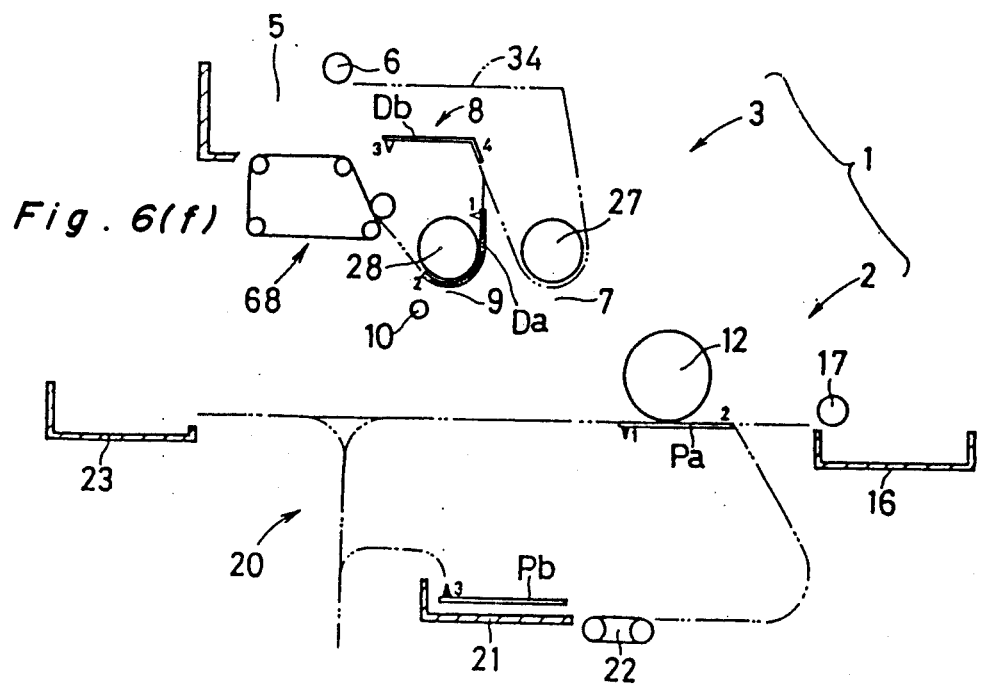
Figure 6G:
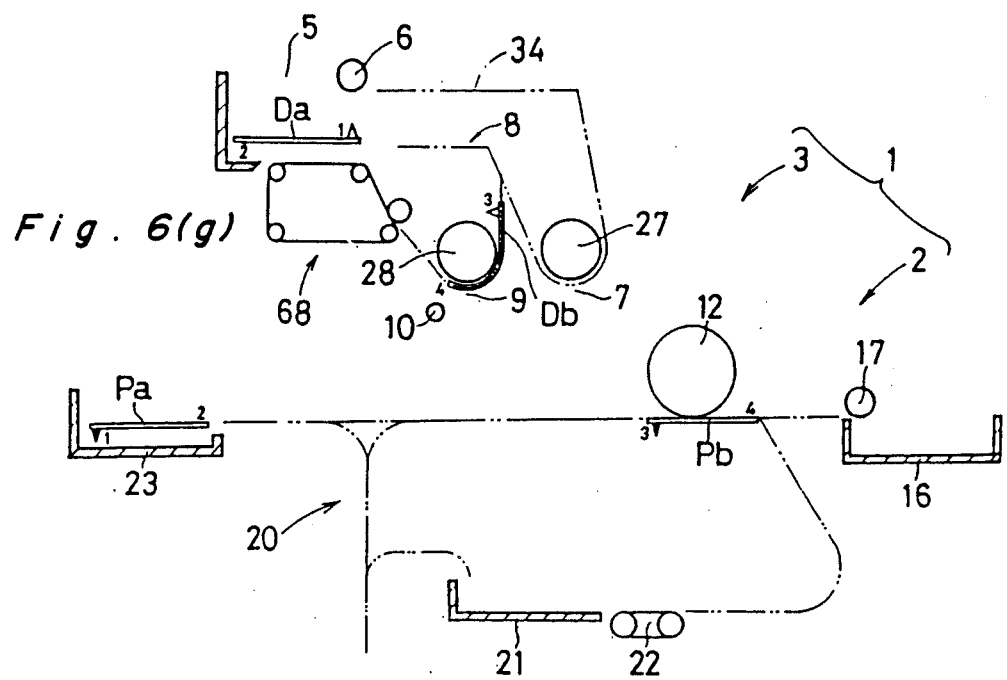
Figure 6H:
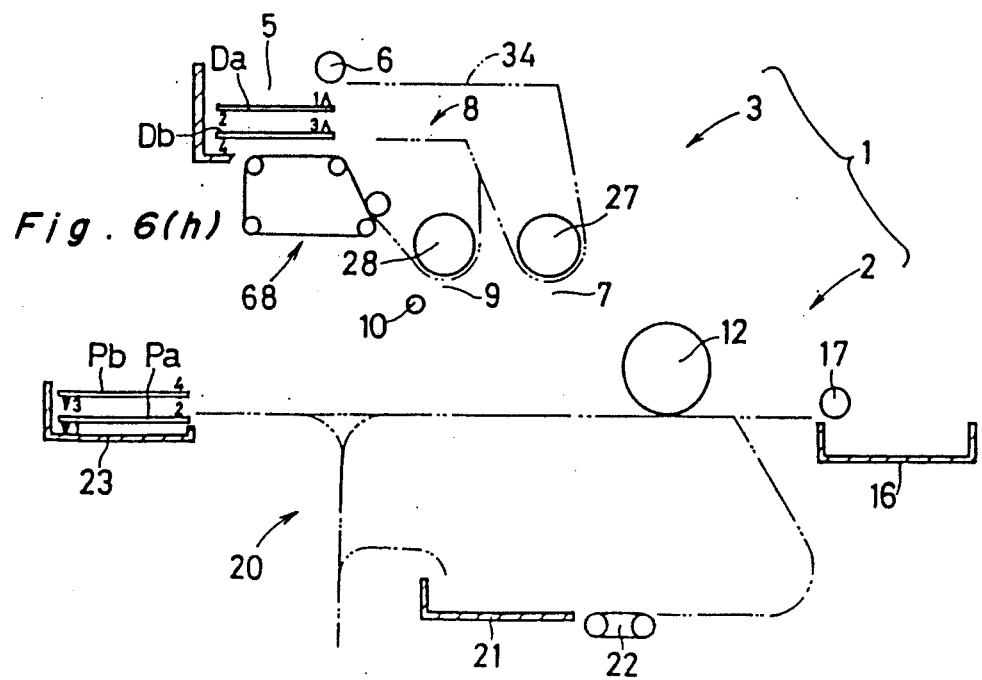
Figure 7A:
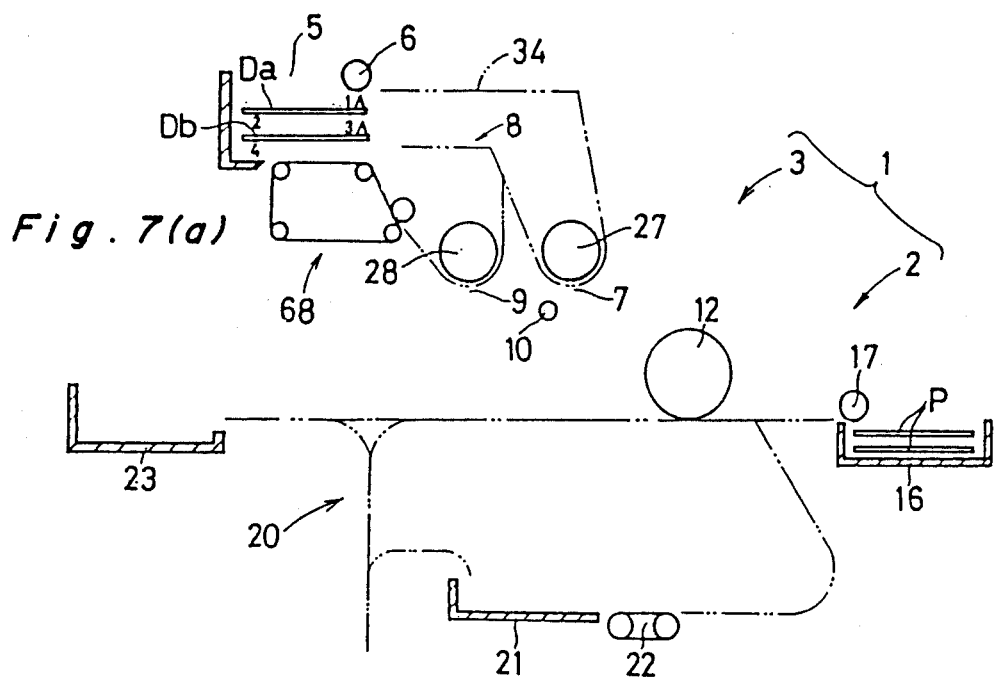
FIG. 7, comprised of FIGS. 7(a) to 7(h), illustrates the sequence of making duplex copies from duplex documents according to another example.
Figure 7B:
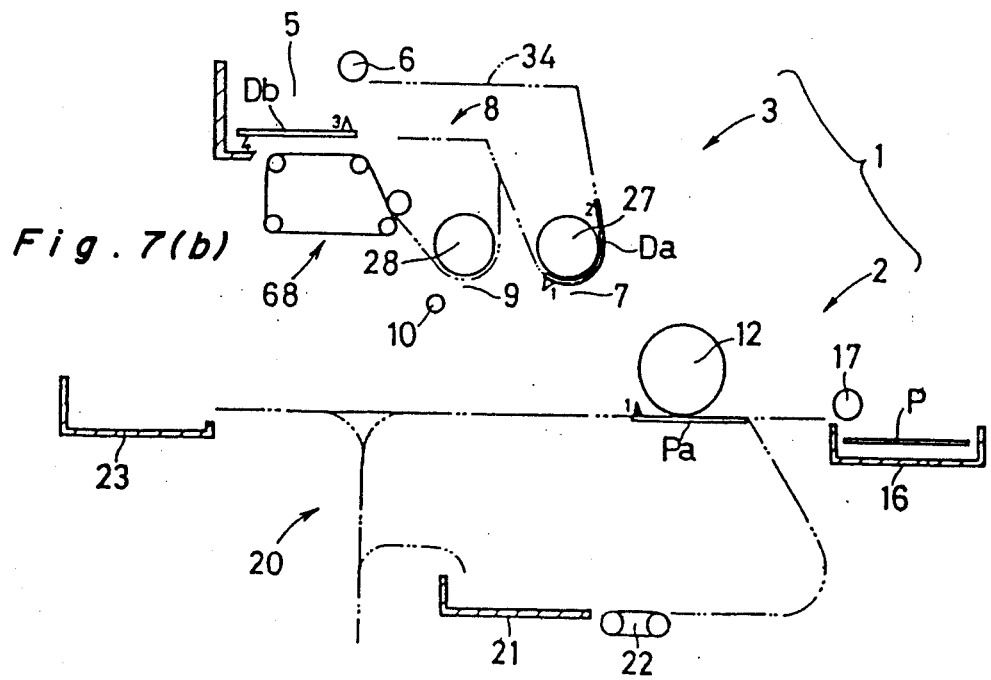
Figure 7C:
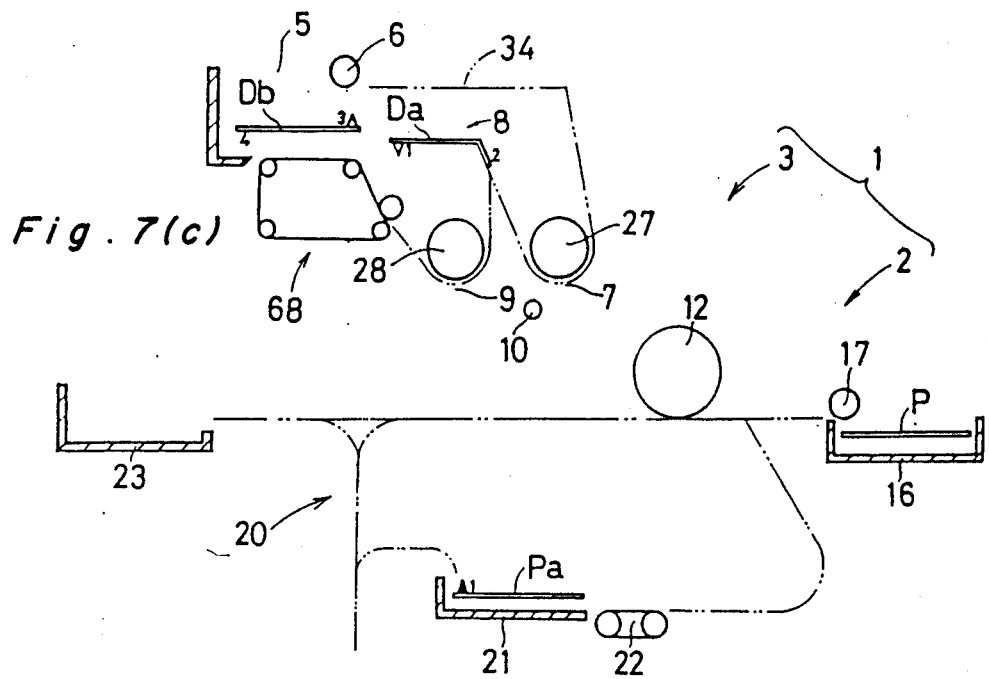
Figure 7D:
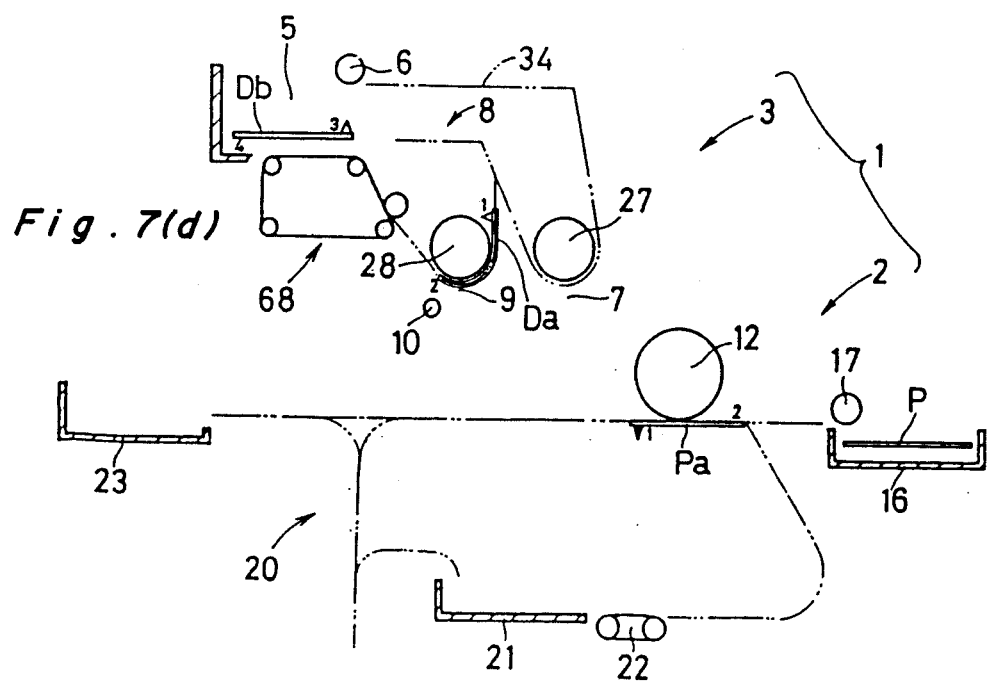
Figure 7E:
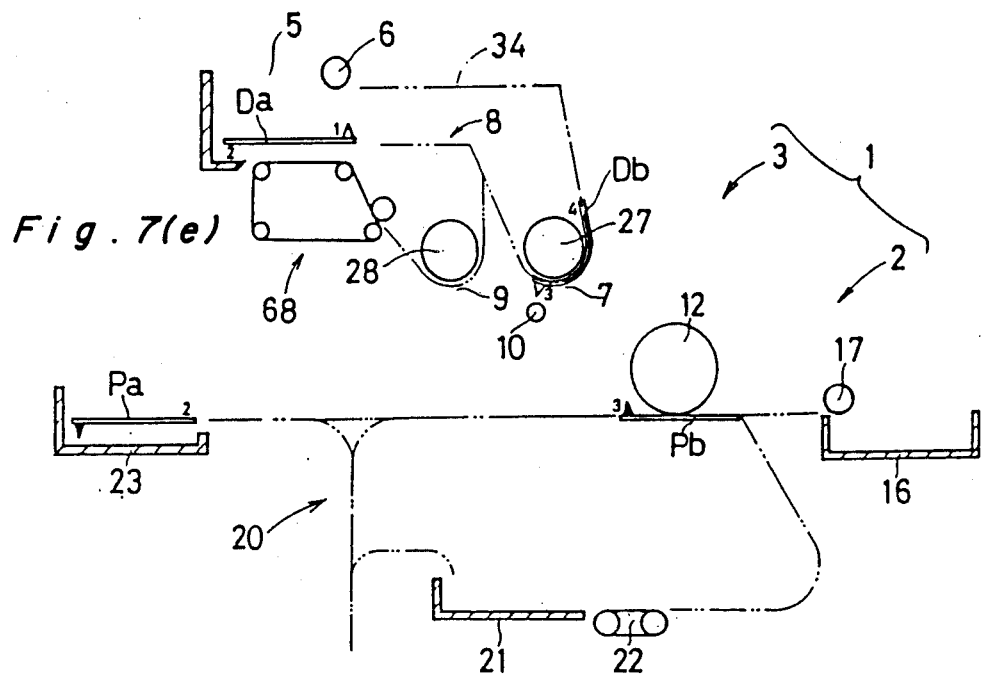
Figure 7F:
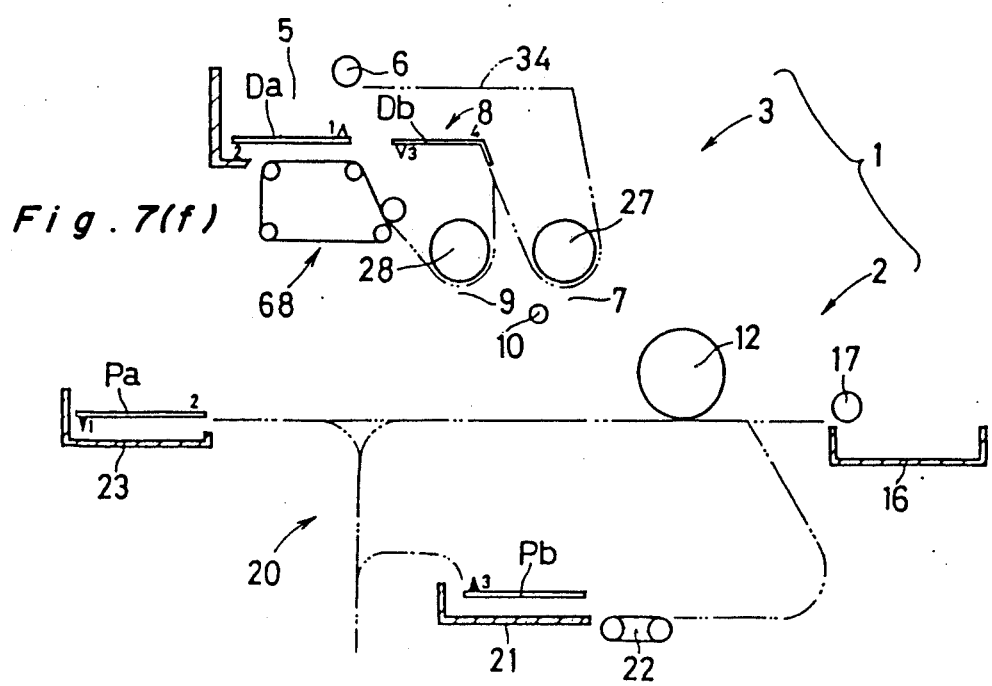
Figure 7G:
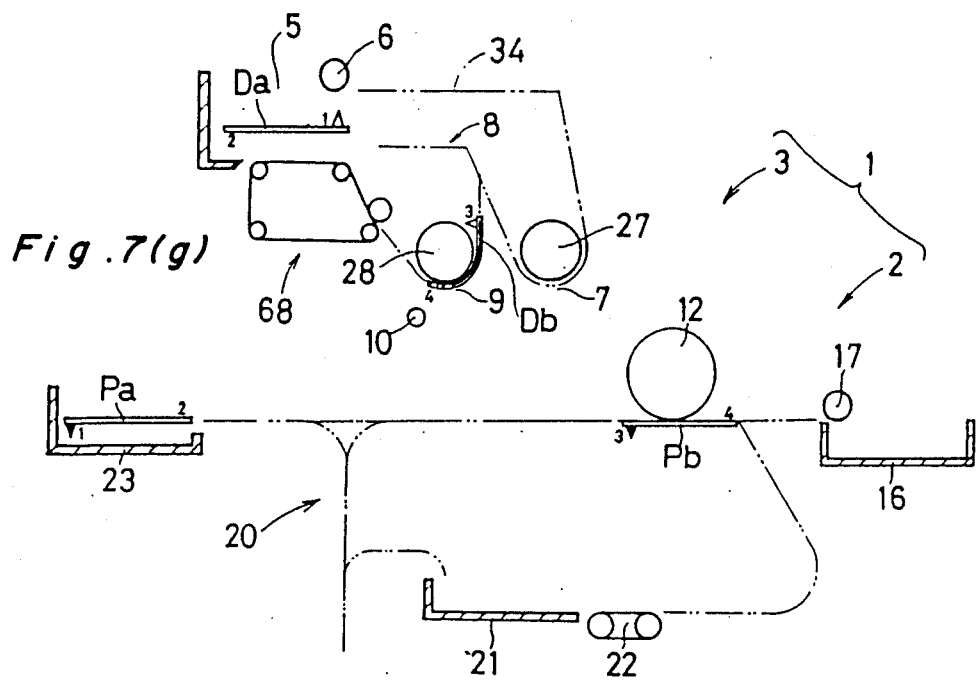
Figure 7H:
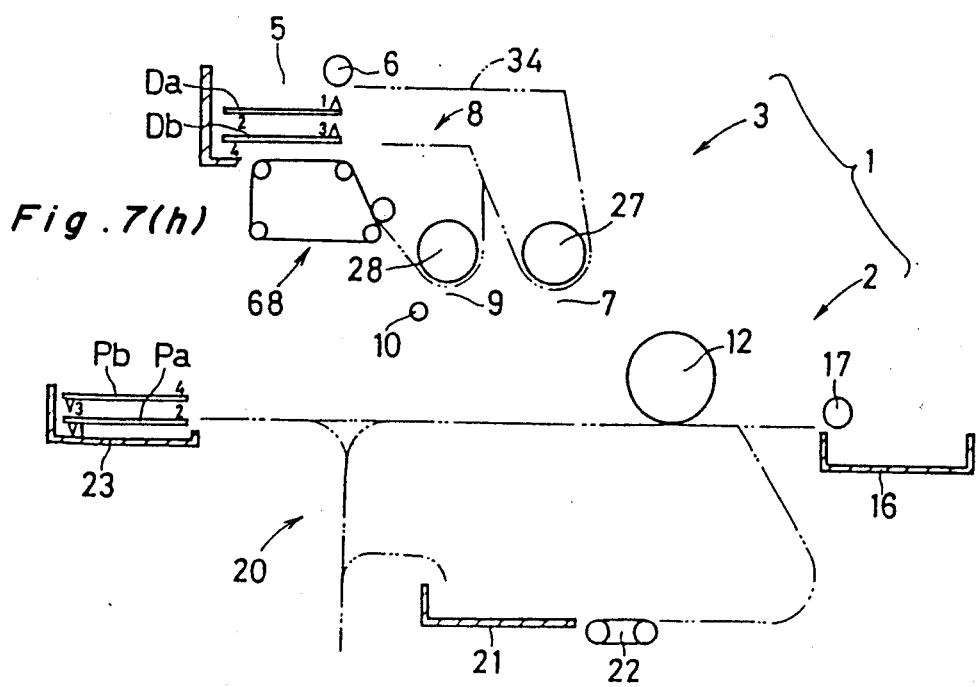

After the first and second documents Da and Db have been completely copied on the first and second copying sheets Pa and Pb in the manner as hereinbefore described, as shown in FIG. 4(f), the documents D returned to the document tray 5 are stacked in the same way as they had been at the start of the copying operation, that is, in the sequentially paginated order with the initial page placed atop the stack of the documents Accordingly, the next succeeding copying operation can be initiated, if desired, or the stack of documents can be removed from the document tray 5, with no need to rearrange the documents within the document tray 5. On the other hand, the resultant duplex copies on the copy receiving tray 23 are stacked in the sequentially paginated order with the initial page placed at the bottom of the stack of the resultant duplex copies FIG. 5 illustrates a flowchart of a control program used to control the copying of the images of the two documents Da and Db on the opposite sides of a copying sheet. Referring to FIG. 5, when the duplex copying is initiated, and at step S1, the first document Da is transported from the document tray 5 towards the first support barrel 27 and, then at step S2, the supply of the first copying sheet Pa from the sheet cassette 16 is initiated. At subsequent step S3, a decision is made to determine if the supply of the copying sheet Pa to the transfer station is regulated by the registering roller pair 94 so that the visible toner image formed on the photosensitive surface of the photoreceptor drum 12, as a result of the document scanning operation as will be described later, can be registered at the transfer station with the first copying sheet Pa. If the supply of the copying sheet Pa to the transfer station has not yet been so regulated, step S3 is repeated and step S4 takes place when and after the supply of the copying sheet Pa to the transfer station has been regulated by the registering roller pair 94.

At step S4, the illuminator lamp 10 of the optical system 11 then stationed in the vicinity of the first reading station 7 is switched on to initiate the document scanning operation, followed by step S5 at which a decision is made to determine if one side of the first document Da being moved past the first reading station 7 is scanned. If it has not yet been scanned, step S5 is repeated until such one side of the first document Da is completely scanned. Thereafter, and at step S6, the illuminator lamp 10 is switched off consequentially upon the completion of the scanning of the first document Da, followed by step S7 at which the document Da having one side completely scanned is transported to the document inverting means 8. At step S8, the second document Db is transported from the document tray 5 towards the first support barrel 27, followed by step S9 at which the first copying sheet Pa having one side copied with the image on one side of the first document Da is delivered to the intermediate tray 21 through the sheet inverting means 20. At subsequent step S10, the supply of the second copying sheet Pb from the cassette 16 is initiated, followed by step S11 at which a decision is made in a manner similar to the decision step S3 to determine if the supply of the second copying sheet Pb to the transfer station is regulated by the registering roller pair 94 so that the visible toner image formed on the photosensitive surface of the photoreceptor drum 12 as a result of the document scanning operation can be registered at the transfer station with the second copying sheet Pb. This step S11 is repeated unless the supply of the second copying sheet Pb to the transfer station is regulated by the registering roller pair 94, but when and after it has been regulated, the program flow advances to step S12.

At step S12, the illuminator lamp 10 is switched on to initiate the scanning of the second document Db, followed by step S13 at which a decision is made to determine if the second document Db moving past the first reading station 7 has been scanned. If it has not yet been scanned, step S13 is repeated until the second document Db is completely scanned. After the complete scanning of the second document Db, step S14 takes place to switch the illuminator lamp 10 off and, at step S15, the optical system 11 is moved from the first reading station to the second reading station 9. At step S16, the second document Db having one side completely scanned at the first reading station is transported to the document inverting means 8, followed by step S17, at which the first document Da is transported from the document inverting means 8 towards the second support barrel 28, conceding the document inverting means 8 to the second document Db. At subsequent step S17, the second copying sheet Pb having one side copied with the image is delivered towards the intermediate tray 21 through the sheet inverting means 20 and, at step S20, the supply of the first copying sheet Pa, having one side copied with the image and held at the intermediate tray 21, is initiated the transfer station. Then, at step S21, a decision is made to determine, in a manner similar to the decision step S3 or S11, if the supply of the copying sheet to the transfer station is regulated, and if it has not yet been regulated, step S20 is repeated before the program flow advance to step S21.

At step S21, the illuminator lamp 10 is switched on to initiate the scanning operation at the second reading station 9. Then, at step S22, a decision is made to determine if the other side of the first document Da, being moved past the second reading station 9, has been scanned. If the scanning of the other side of the first document Da at the second reading station 9 has not yet been finished, step S22 is repeated before the program flow advances to step S23. Consequently, upon the completion of the scanning of the other side of the first document Da, the illuminator lamp 10 is switched off at step S23 and, on the other hand, at step S24, the first document Da having its opposite sides having been completely scanned is returned to the document tray 5. Subsequently, at step S25, the second document Db temporarily held at the document inverting means 8 is transported towards the second support barrel 28, followed by step S26 at which the first copying sheet Pa having its opposite sides copied with the images is ejected onto the copy receiving tray 23. Then, at step S27, the supply of the second copying sheet having one side copied with the image and temporarily held at the intermediate tray 21 is initiated, followed by step S28 at which a decision is made in a manner similar to the decision step S3, S11 or S20 to determine if the supply of the second copying sheet Pb towards the transfer station is regulated. Unless the supply of the second copying sheet Pb is regulated, step S28 is repeated.

Thereafter, at step S29, the illuminator lamp 10 is switched on and, at step S30, a decision is made to determine if the other side of the second document Db, being moved past the second reading station 9, has been scanned. If it has not yet been scanned, step S30 is repeated before the program flow advances to step S31.

Consequently, upon the completion of the scanning of the other side of the second document Db, at step S31, the illuminator lamp 10 is switched off and the optical system 11 is again moved from the second reading station 9 back to the first reading station 7. At subsequent step S32, the second document Db having its opposite sides completely scanned is returned to the document tray 5 and, at step S33, the second copying sheet Pb having its opposite sides copied with the images is ejected onto the copy receiving tray 23. In this way, the duplex copying of the duplex documents Da and Db on the duplex copying sheets Pa and Pb, respectively, is completed.

Thus, with the copying machine 1 equipped with the above described recirculating document handling mechanism, and at the time the duplex copying operation is carried out, the first document can be transported to the document inverting means after an image of one side of the first document has been copied, and, on the other hand, a copying of an image on one side of the second document is carried out while the copying sheet having one side copied with the image is transported through the sheet inverting means towards the intermediate tray. Therefore, the length of time required to accomplish the duplex copying for making the duplex copies from the duplex documents can be advantageously reduced.

The illustrated embodiment of the present invention is so designed and so structured that the second-fed document can be transported in pursuit of the first-fed document. As another example, if the system is so designed and so structured to have an enough time available between the timing at which the second document is moved past the first reading station and the timing at which the first document is subsequently moved past the second reading station and also to have a space enough to avoid any possible collision between the first and second documents within the document inverting means, a third-fed document may be transported in pursuit of the second-fed document, that is, three documents may be simultaneously transported during the actual copying operation, thereby to reduce the time required to complete the copying job.

The copying machine equipped with the recirculating document handling mechanism of the present invention can be advantageously applied when the duplex copies are desired to be made from the duplex documents. In addition, the copying machine equipped with the recirculating mechanism can also be applied in selectively making simplex copies from simplex documents, duplex copies from simples documents, and simplex copies from duplex documents and these will be briefly described with reference to FIG. 1.

Where simplex copies are desired to be made from simplex documents, that is, where information on one side of each document is desired to be copied on one side of a copying sheet, the document D has to be placed on the document tray 5 with the information bearing side thereof oriented upwards as viewed in FIG. 1. After the document D at the top of the stack of the documents has been drawn out from the document tray 5, the information bearing side thereof is scanned at the first reading station 7 and is then transported past the second reading station 9 without being scanned, finally being returned onto the document tray 5 from below. On the other hand, after the information on such one side of the document which has been scanned at the first reading station 7 has been duplicated on one side of the recording paper P, the copying sheet P is ejected onto the copy receiving tray 23.

In the case of the duplex copying from the simplex documents, in which respective information on one side of each of the two documents are copied on the opposite sides of a copying sheet, the documents D have to be placed on the document tray 5 with their information bearing sides oriented upwards. The respective information bearing sides of the first-fed and second-fed documents are, after having been moved past the first reading station 7 at different times, scanned thereat and are then returned to the document tray 5 from below without being scanned at the second reading station 9. As far as the copying sheet P is concerned, the copying sheet P, after one side thereof have been copied with the image on the information bearing side of the first-fed document Da, is delivered through the sheet inverting means 20 to the intermediate tray 5. Thereafter, the copying sheet P is again supplied from the intermediate tray 21 onto the transfer station so that an image on the information bearing side of the second-fed document Db which is scanned at the first reading station 7 subsequent to the scanning of the first-fed document Da can be copied on the other side of the same copying sheet P. Then, the copying sheet having its opposite sides copied with the images on the respective sides of the first-fed and second-fed documents Da and Db is subsequently ejected onto the copy receiving tray 23.

In the case of making simplex copies from duplex documents, that is, where images on the opposite sides of each document are desired to be copied on respective one sides of two copying sheets, the duplex documents have to be placed on the document tray 5. After the uppermost document D has been drawn out from the document tray 5, the opposite information bearing sides of the document D can be scanned at the first and second reading stations 7 and 9, respectively. The documents having its opposite sides scanned is returned to the document tray 5 from below. On the other hand, after the image on one side of the duplex document D has been copied on the copying sheet P, such copying sheet P can be ejected onto the copy receiving tray 23.

Thus, according to the present invention, since during the copying operation, the successive transportation of the documents through the document transport passage means within the recirculating document handling mechanism parallels the transportation of the copying sheets which are equal in number to the number of the documents being transported and which are moved along the transport passage means within the machine housing, the length of time required to complete the copying job can be advantageously reduced, permitting the operator to maximize the utilization of a time.

Although the present invention has been fully described in connection with the preferred embodiment thereof with reference to the accompanying drawings, it is to be noted that various changes and modifications are apparent to those skilled in the art without departing from the scope of the present invention as defined by the appended claims. Such changes and modifications are to be construed as included within the scope of the present invention.

I claim:

1. An automatic document recirculating system which comprises:

a document storage means for accommodating a plurality of sheet-like documents to be copied;

a first document presenting portion for supporting thereon documents successively drawn from said document storage means so that one of two sides of each of said documents can be scanned;

a second document presenting portion for supporting thereon each of said documents which has passed through said first document presenting portion, so that the other of said two sides of each of said documents can be scanned;

a document handling mechanism including a document inverting means positioned between said first and second document presenting portions for inverting each of said documents which has passed through said first document presenting portion;

a document illuminating means supported for movement between first and second positions which are aligned with said first and second document presenting portions, respectively;

a drive means for driving said document illuminating means to said first position when a document supported on said first document presenting portion is to be illuminated and for driving said document illuminating means to said second position when a document supported on said second document presenting portion is to be illuminated; and means for causing a first document illuminated at said first position to be inverted by said document inverting means while a second document is being scanned for the first time by said document illuminating means at said first position.

2. The automatic document recirculating system of claim 1, further including means for causing said second document illuminated at said first position to be inverted by said document inverting means while said inverted first document is being scanned by said document illuminating means at said second position.

* * * * *